United States Patent
Matsuda et al.

(10) Patent No.: US 12,217,469 B2
(45) Date of Patent: Feb. 4, 2025

(54) PHOTOGRAPHING APPARATUS AND AUTHENTICATION APPARATUS

(71) Applicant: Hitachi, Ltd., Tokyo (JP)

(72) Inventors: Yusuke Matsuda, Tokyo (JP); Naoto Miura, Tokyo (JP); Akio Nagasaka, Tokyo (JP); Yo Nonomura, Tokyo (JP); Keiichiro Nakazaki, Tokyo (JP); Masahiro Kato, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 305 days.

(21) Appl. No.: 17/944,048

(22) Filed: Sep. 13, 2022

(65) Prior Publication Data

US 2023/0281284 A1  Sep. 7, 2023

(30) Foreign Application Priority Data

Mar. 3, 2022 (JP) ................................. 2022-032968

(51) Int. Cl.
*G06V 10/143* (2022.01)
*G06V 10/141* (2022.01)
(Continued)

(52) U.S. Cl.
CPC .......... *G06V 10/143* (2022.01); *G06V 10/141* (2022.01); *G06V 10/44* (2022.01);
(Continued)

(58) Field of Classification Search
CPC .... G06V 10/143; G06V 10/141; G06V 10/44; G06V 10/60; G06V 40/117;
(Continued)

(56) References Cited

U.S. PATENT DOCUMENTS

2010/0061598 A1  3/2010  Seo
2018/0177405 A1  6/2018  Sasaguri et al.
(Continued)

FOREIGN PATENT DOCUMENTS

EP  1 654 984 A2  5/2006
EP  3 223 194 A2  9/2017
(Continued)

OTHER PUBLICATIONS

Extended European Search Report received in co-pending European Application No. EP 22195586.7, dated Jun. 22, 2023, in 9 pages.

*Primary Examiner* — Siamak Harandi
*Assistant Examiner* — Andrew S Budisalich
(74) *Attorney, Agent, or Firm* — PROCOPIO, CORY, HARGREAVES & SAVITCH LLP

(57) ABSTRACT

A photographing apparatus includes an irradiation unit configured to irradiate a living body with beams of light having a plurality of wavelengths different from one another, a photographing unit configured to photograph the living body irradiated by the irradiation unit to generate image data of the living body, an image processing module configured to generate, based on the image data generated by the photographing unit, a plurality of pieces of wavelength separation image data, by separation into the plurality of wavelengths, and a control module configured to control, based on the image data and on the plurality of pieces of wavelength separation image data generated by the image processing module, irradiation light amounts of the beams of light having the plurality of wavelengths.

7 Claims, 9 Drawing Sheets

(51) Int. Cl.
*G06V 10/44* (2022.01)
*G06V 10/60* (2022.01)
*G06V 40/10* (2022.01)
*G06V 40/12* (2022.01)

(52) U.S. Cl.
CPC ............ *G06V 10/60* (2022.01); *G06V 40/117* (2022.01); *G06V 40/1341* (2022.01); *G06V 40/1365* (2022.01); *G06T 2207/10048* (2013.01); *G06T 2207/10152* (2013.01)

(58) Field of Classification Search
CPC ........... G06V 40/1341; G06V 40/1365; G06V 10/776; G06V 10/811; G06V 40/1312; G06V 40/145; G06V 40/1318; G06T 2207/10048; G06T 2207/10152; H04L 9/3231
See application file for complete search history.

(56) References Cited

U.S. PATENT DOCUMENTS

| | | | | |
|---|---|---|---|---|
| 2018/0180534 | A1* | 6/2018 | Noda | G01N 21/27 |
| 2019/0125221 | A1* | 5/2019 | Kobayashi | G06T 1/0007 |
| 2023/0044097 | A1* | 2/2023 | Kurita | A61B 5/107 |

FOREIGN PATENT DOCUMENTS

| | | |
|---|---|---|
| EP | 4 006 849 A2 | 6/2022 |
| JP | 2017023705 A | 2/2017 |

\* cited by examiner

PHOTOGRAPHING APPARATUS AND AUTHENTICATION APPARATUS

CLAIM OF PRIORITY

The present application claims priority from Japanese patent application JP 2022-32968 filed on Mar. 3 2022, the content of which is hereby incorporated by reference into this application.

BACKGROUND

This invention relates to a photographing apparatus which photographs a living body, and an authentication apparatus which photographs and authenticates a living body.

There is a biometric authentication technology in which a living body is irradiated with light from a light source, and a biometric image acquired by photographing reflected light thereof is used to execute biometric authentication. When near-infrared light is selected as irradiation light, biometric authentication is executable with use of a blood vessel image acquired by photography that utilizes a difference between hemoglobin in blood and other body tissues in light absorption characteristics with respect to near-infrared light. When visible light in a wavelength range of green light or blue right is selected as irradiation light, biometric authentication is executable with use of an epidermal image acquired by photographing surface irregularities of a skin by which an individual is identifiable, such as a fingerprint or joint wrinkles.

One of living body photographing methods for implementing an authentication technology that uses a blood vessel image or an epidermal image of a finger, or a similar biometric image, with the same apparatus configuration is a reflection method. The reflection method is a method of acquiring a biometric image by arranging a light source and an imaging unit close to each other, irradiating a living body with irradiation light from the light source, and imaging light reflected from the living body.

JP 2004-178498 A discloses a subject information acquisition device to reduce an influence of a component that is not the subject of measurement in information obtained by Photoacoustic Imaging (PAI). The subject information acquisition device comprises a light source for emitting first light having a first wavelength $\lambda 1$ and second light having a second wavelength $\lambda 2$; detection means for converting a photoacoustic wave generated from a subject into a detection signal; signal processing means for acquiring characteristic information from the detection signal; and light intensity acquisition means for acquiring incident light intensity emitted to the subject. The signal processing means acquires the characteristic information by subtraction processing between a signal generated when the first light is absorbed by hemoglobin and a signal generated when the second light is absorbed by hemoglobin. The first wavelength is 780-810 nm and the second wavelength is 840-920 nm. When the incident light intensity of the first and second light are defined as $\Phi(\lambda 1)$, $\Phi(\lambda 2)$, the relation of $\Phi(\lambda 1) \leq \Phi(\lambda 2)$ is satisfied and a difference between $\Phi(\lambda 1)$ and $\Phi(\lambda 2)$ is adjusted so as to be within a prescribed range.

When a clear biometric image is to be photographed by irradiating a living body with beams of light of a plurality of wavelengths at the same time, luminance that is at a level of saturation or too low in a living body part of image data of one component out of RGB image data causes a loss of biometric information in that living body part. It is accordingly a possibility that biometric information of the living body part is lost also in wavelength separation image data generated by spectroscopic processing of the RGB image data. Even when the beams of light of the plurality of wavelengths are each adjusted in amount of light so that brightness (luminance) of the RGB image data is appropriate, the adjustment does not guarantee appropriate brightness (luminance) in the generated wavelength separation image data.

SUMMARY

It is an object of this invention to acquire clear wavelength separation image data. An aspect of the disclosure in the present application is a photographing apparatus, comprising: an irradiation unit configured to irradiate a living body with beams of light having a plurality of wavelengths different from one another; a photographing unit configured to photograph the living body irradiated by the irradiation unit to generate image data of the living body; an image processing module configured to generate, based on the image data generated by the photographing unit, a plurality of pieces of wavelength separation image data, by separation into the plurality of wavelengths; and a control module configured to control, based on the image data and on the plurality of pieces of wavelength separation image data generated by the image processing module, irradiation light amounts of the beams of light having the plurality of wavelengths.

According to the representative embodiment of this invention, clear wavelength separation image data can be acquired. Other features, aspects, and advantages of the subject matter will become apparent from the description, the drawings, and the claims.

DETAILED DESCRIPTION OF THE EMBODIMENTS

First Embodiment

Biometric Authentication Example

Figure 1:
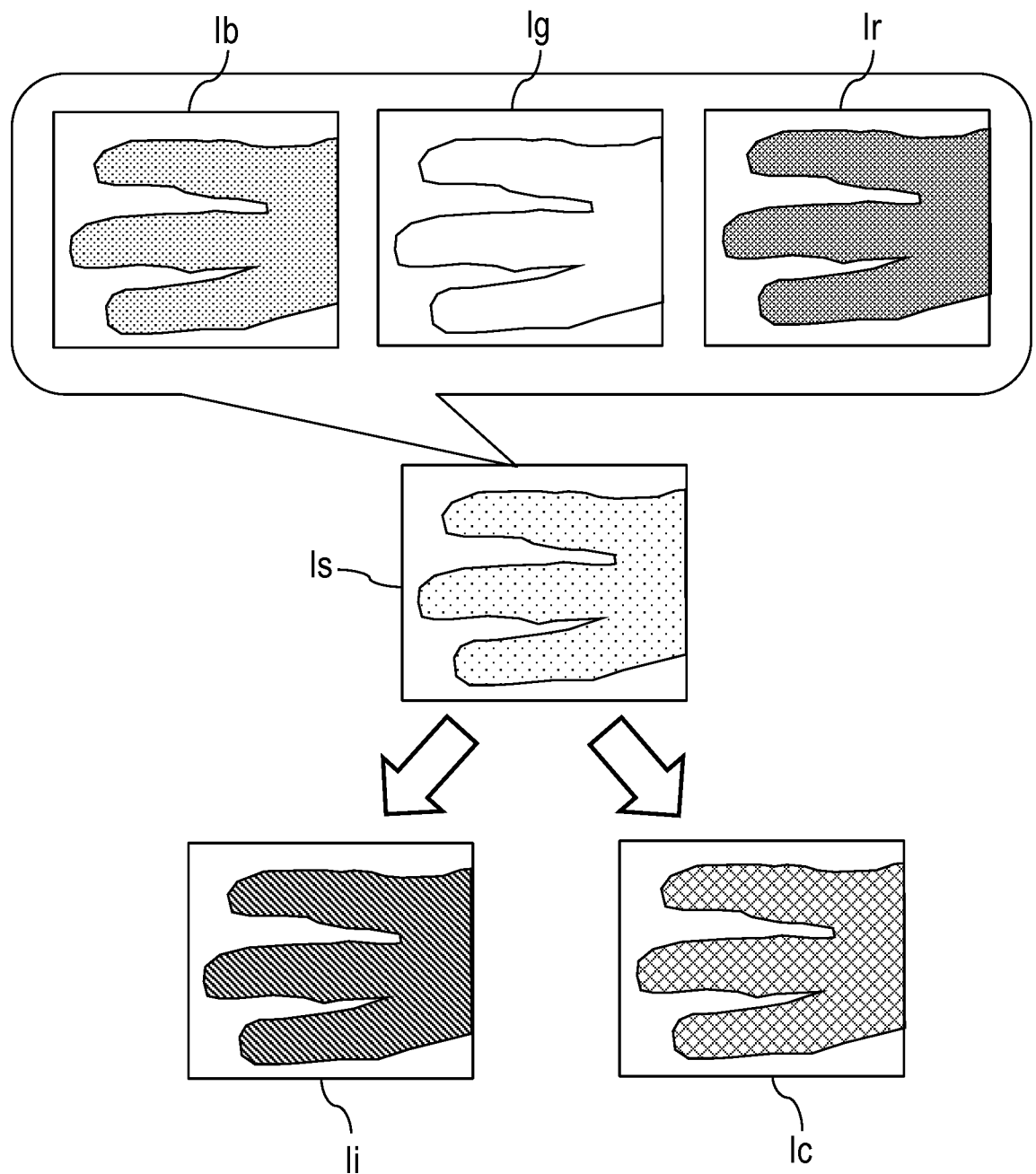
FIG. 1 is an explanatory diagram for illustrating a biometric authentication example.

FIG. 1 is an explanatory diagram for illustrating a biometric authentication example. In FIG. 1, an example of executing biometric authentication by imaging three fingers is illustrated. An authentication apparatus executes imaging of fingers irradiated by light sources that output beams of light of multiple wavelengths, to thereby generate photographed image data Is of the fingers. The photographed image data Is of the fingers is RGB image data including R-component image data Ir, G-component image data Ig, and B-component image data Ib. A case in which wavelengths of light irradiated from the light sources include a near-infrared wavelength and a wavelength of green light, and the G-component image data Ig is highest in luminance and is accordingly liable to luminance saturation is described here as an example.

The authentication apparatus accordingly generates near-infrared wavelength separation image data Ii and green light wavelength separation image data Ic from the photographed image data Is by wavelength separation. The authentication apparatus uses the G-component image data Ig, which is highest in luminance out of the R-component image data Ir, the G-component image data Ig, and the B-component image data Ib, to control amounts of light of the light sources so that the near-infrared wavelength separation image data Ii and the green light wavelength separation image data Ic each have objective luminance.

To give a specific example, the authentication apparatus adjusts the amounts of light of the light sources so that the luminance of the G-component image data Ig is within a predetermined range, and so that the near-infrared wavelength separation image data Ii and the green light wavelength separation image data Ic each have objective luminance, based on:

(A) relationships of the luminance of the R-component image data Ir to the luminance of the near-infrared wavelength separation image data Ii and to the luminance of the green light wavelength separation image data Ic;

(B) relationships of the luminance of the G-component image data Ig to the luminance of the near-infrared wavelength separation image data Ii and to the luminance of the green light wavelength separation image data Ic; and (C) relationships of the luminance of the B-component image data Ib to the luminance of the near-infrared wavelength separation image data Ii and to the luminance of the green light wavelength separation image data Ic.

This invention thus aims to simultaneously accomplish suppression of luminance saturation of the photographed image data Is and stabilization of the luminance of the near-infrared wavelength separation image data Ii and the luminance of the green light wavelength separation image data Ic.

Figure 2:
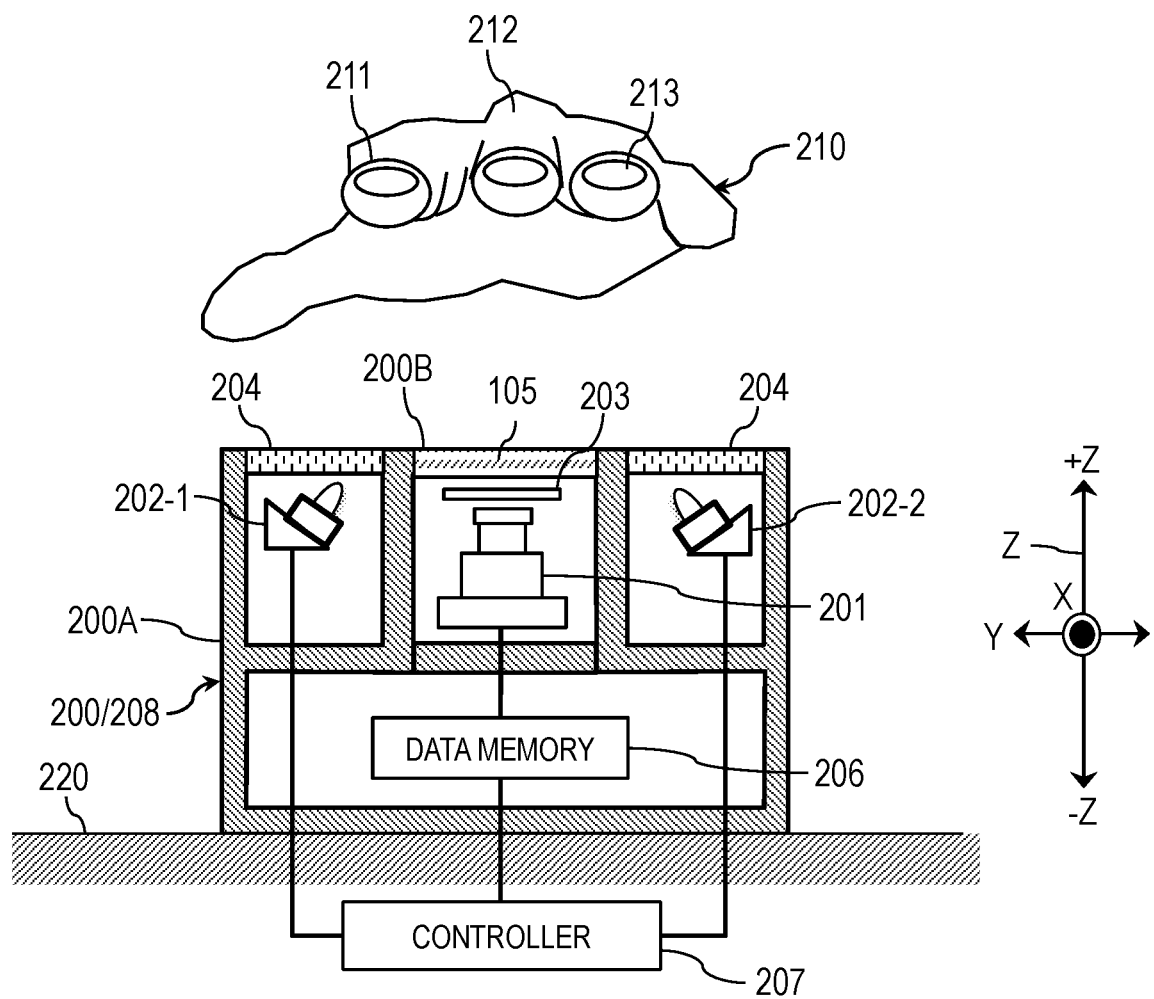
FIG. 2 is a block diagram for illustrating configuration examples of a photographing apparatus and an authentication apparatus according to a first embodiment of this invention.

Configuration Examples of Photographing Apparatus and Authentication Apparatus FIG. 2 is a block diagram for illustrating configuration examples of a photographing apparatus and an authentication apparatus according to a first embodiment of this invention. A photographing apparatus 200 photographs fingers of a hand 210 placed as a subject over an upper plate portion 200B of a housing 200A. In the first embodiment, as an example, an index finger 211, a middle finger 212, and a third finger 213 are the subject (object to be imaged). It is only required that the fingers 211 to 213 as the subject include two or more of ten fingers of both hands 210. Surfaces of the fingers 211 to 213 on the back side of the hand 210 are referred to as front surfaces of the fingers 211 to 213, and surfaces of the fingers 211 to 213 on the palm side of the hand 210 are referred to as back surfaces of the fingers 211 to 213.

In FIG. 2, the photographing apparatus 200 includes the housing 200A, an imaging unit 201, light sources 202, and a data memory 206. An apparatus obtained by coupling a controller 207 to the photographing apparatus 200 is an authentication apparatus 208. The housing 200A is installed or placed (hereinafter collectively referred to as "mounted") on, for example, a mounting surface 220. The mounting surface 220 may be the ground, a ceiling surface, or a surface of a table parallel to the ground, such as a desk, or may be a surface perpendicular to the ground, such as a wall. An axis orthogonal to the mounting surface 220 is defined as a Z axis, a direction of being separated from the mounting surface 220 in the Z axis is defined as a +Z direction, and a direction of approaching the mounting surface 220 is defined as a −Z direction. Further, the mounting surface 220 is parallel to an XY plane. The XY plane is a plane formed by an X axis and a Y axis.

As illustrated in FIG. 2, the photographing apparatus 200 and the authentication apparatus 208 are mounted so that the hand 210 is placed over the upper plate portion 200B. In this case, the X axis is a longitudinal direction of the fingers at the time when the hand 210 is placed. The Y axis is an array direction of the fingers 211 to 213.

The housing 200A includes the imaging unit 201 and a plurality of light sources 202 (in FIG. 2, light sources 202-1 and 202-2) therein. The light sources 202-1 and 202-2 are simply referred to as the light sources 202 when no distinction is made therebetween. Further, between the imaging unit 201 and the upper plate portion 200B of the housing 200A, a first optical filter 203 is provided.

The imaging unit 201 receives subject light that has passed through the first optical filter 203. The subject light is light (reflected light) obtained by irradiation light from the light sources 202 being reflected by the subject. The first optical filter 203 transmits only light of a specific wavelength. This prevents the imaging unit 201 from receiving irrelevant light, and consequently suppresses noise in the photographed image data Is. The imaging unit 201 and the upper plate portion 200B of the housing 200A are opposed to the presented hand 210.

Further, in a region of the upper plate portion 200B that exists in the +Z direction from the imaging unit 201, there is provided a light transmitting plate 205 which transmits light obtained by the irradiation light from the light sources 202 being reflected by a living body such as the fingers 211 to 213. The light transmitting plate 205 is formed of a transparent member made of, for example, acryl or glass. Still further, a film which passes only light having a specific wavelength may be bonded to the light transmitting plate 205. With this configuration, a state in which it is difficult to visually check the inside of the photographing apparatus 200 from the outside can be achieved.

Alternatively, the first optical filter 203 and second optical filters 204 may be a polarizing filter. With this configuration, of components of the light irradiated on and reflected by the living body such as the fingers 211 to 213, components specularly reflected on a skin surface can be reduced.

Consequently, the photographing apparatus 200 can take a blood vessel image of the living body more clearly. Still alternatively, the second optical filters 204 may be a band pass filter which transmits only a specific wavelength of the irradiation light from the light sources 202. This enables the imaging unit 201 to more efficiently receive light of a specific wavelength.

The imaging unit 201 includes a color imaging element, for example, a complementary metal oxide semiconductor (CMOS) image sensor or a charge-coupled device (CCD) image sensor, and generates image data of a plurality of colors such as RGB. An imaging surface of the imaging unit 201 is opposed to the upper plate portion 200B.

The imaging unit 201 receives, on the imaging surface, light that enters from the outside of the housing 200A through the light transmitting plate 205 of the upper plate portion 200B and the first optical filter 203, and photoelectrically converts the light. The imaging unit 201 is coupled to the data memory 206, and stores image data Is obtained as a result of the photoelectric conversion in the data memory 206.

The image data Is finger image data including a plurality of pieces of biometric information, such as blood vessels of fingers, fingerprints and other surface irregularities of the skin, and color information of the skin surface based on differences in light absorption characteristics among melanin, a cuticle, and other skin tissues. The image data Is may be image data indicating only blood vessels of fingers (finger blood vessel image data). The image data Is may also be image data indicating only fingerprints and other surface irregularities of the skin, or only color information of the skin surface based on differences in light absorption characteristics among melanin, a cuticle, and other skin tissues (finger surface image data). The finger image data, the finger blood vessel image data, and the finger surface image data are hereinafter collectively referred to as "finger image data Is." The data memory 206 is coupled to the controller 207.

The light sources 202 irradiates the subject that exists in the +Z direction from the upper plate portion 200B with light via the second optical filters 204. In the case in which the blood vessels of the fingers are to be photographed, the irradiation light from the light sources 202 is, for example, near-infrared light. In the case in which the skin surfaces of the fingers are to be photographed, the irradiation light from the light sources 202 is, for example, visible light, such as green light or blue light.

The light sources 202 are coupled to the controller 207 provided on the outside of the housing 200A. The controller 207 controls amounts of light irradiated from the light sources 202. The controller 207 also detects positions of the fingers 211 to 213, and extracts features of the blood vessels or the fingerprints in the fingers 211 to 213 from the finger image data. The controller 207 may further authenticate a plurality of types of finger image data stored in the data memory 206.

Specifically, for example, the controller 207 acquires two sets of finger image data Is from the data memory 206, and authenticates whether the index finger 211, the middle finger 212, and the third finger 213 in the both sets of finger image data Is are the index finger 211, the middle finger 212, and the third finger 213 of the same person based on the features of the blood vessels of the fingers and the features of the skin surfaces of the fingers.

Figure 3:
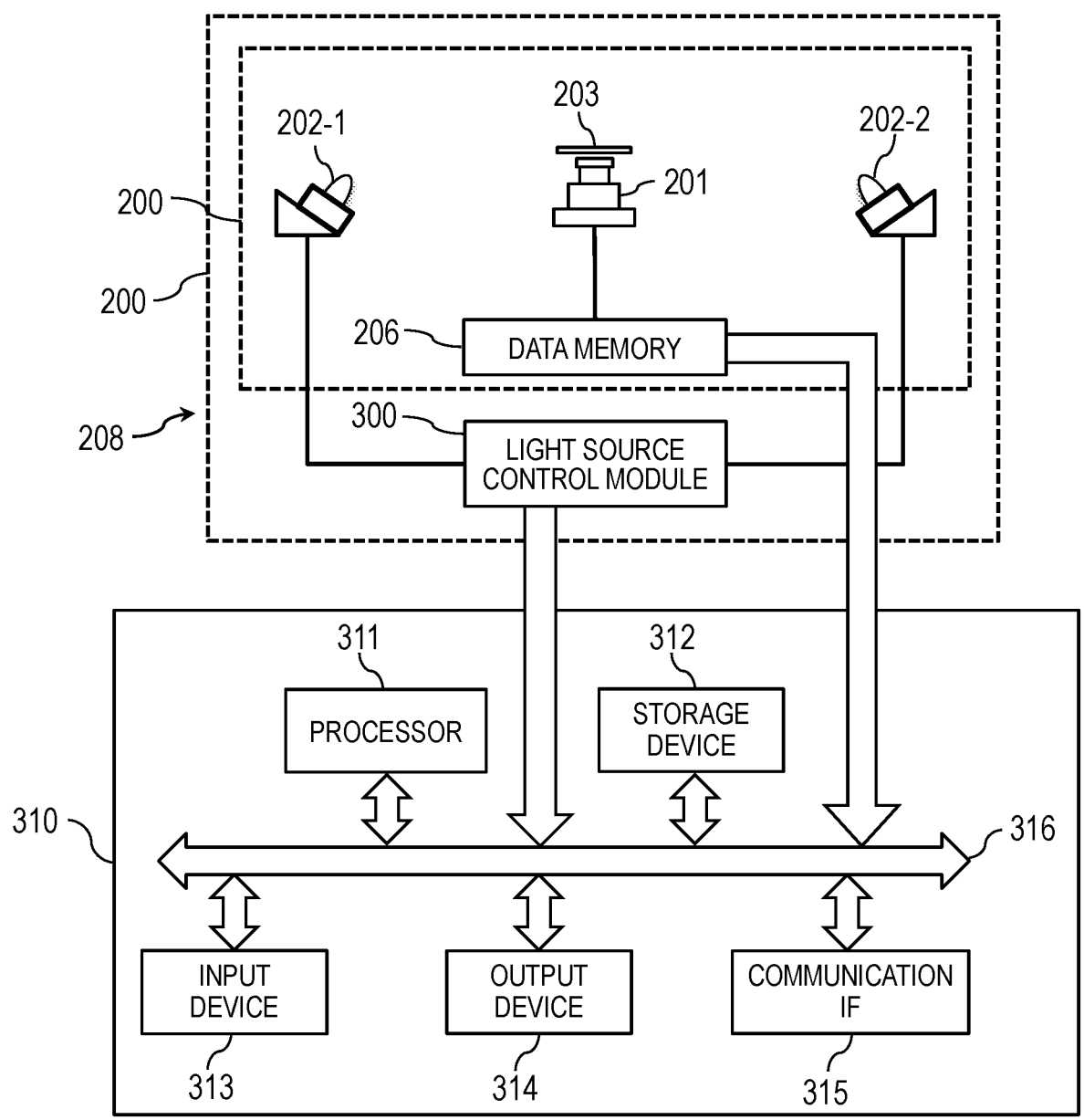
FIG. 3 is a block diagram for illustrating Block Configuration Example 1 of the photographing apparatus and the authentication apparatus according to the first embodiment.

FIG. 3 is a block diagram for illustrating Block Configuration Example 1 of the photographing apparatus 200 and the authentication apparatus 208 according to the first embodiment. The photographing apparatus 200 includes a light source control module 300. The light source control module 300 controls an amount of irradiation light from the light sources 202. The light source control module 300 is included in the controller 207 illustrated in FIG. 2. A computer 310 includes an authentication function. The computer 310 is included in the controller 207 illustrated in FIG. 2.

Hardware Configuration Example of Computer

The computer 310 includes a processor 311, a storage device 312, an input device 313, an output device 314, and a communication interface (communication IF) 315. The processor 311, the storage device 312, the input device 313, the output device 314, and the communication IF 315 are coupled to one another through a bus 206. The processor 311 is configured to control the computer 310. The storage device 312 serves as a work area for the processor 311. The storage device 312 is also a non-transitory or transitory recording medium configured to store various programs and various kinds of data. Examples of the storage device 312 include a read only memory (ROM), a random-access memory (RAM), a hard disk drive (HDD), and a flash memory. The input device 313 is configured to input data. Examples of the input device 313 include a keyboard, a mouse, a touch panel, a numeric keypad, and a scanner. The output device 314 is configured to output data. Examples of the output device 314 include a display, a printer, and a speaker. The communication IF 315 is coupled to the network, and is configured to transmit and receive data.

Examples of the programs stored in the storage device 312 described above include an image processing program, a light source control program, and an authentication program. The image processing program is a program for causing the processor 311 to generate image data based on an output signal from the imaging unit 201. The light source control program is a program for causing the processor 311 to increase or reduce amounts of irradiation light from the light sources 202. The authentication program is a program for causing the processor 311 to authenticate the identity of finger image data Is stored in the storage device 312. The description has been given of an example of implementing the functions of image processing, light source control, and authentication by software, but the functions of image processing, light source control, and authentication may be implemented by dedicated circuits.

In other words, the photographing apparatus 200 not including the light source control module 300 is the photographing apparatus 200 illustrated in FIG. 2, and the photographing apparatus 200 including the light source control module 300 is the photographing apparatus 200 illustrated in FIG. 3. Further, the authentication apparatus 208 having the functions of image processing, light source control, and authentication includes the light source control module 300 and the computer 310, and corresponds to the authentication apparatus 208 of FIG. 2 and FIG. 3.

Figure 4:
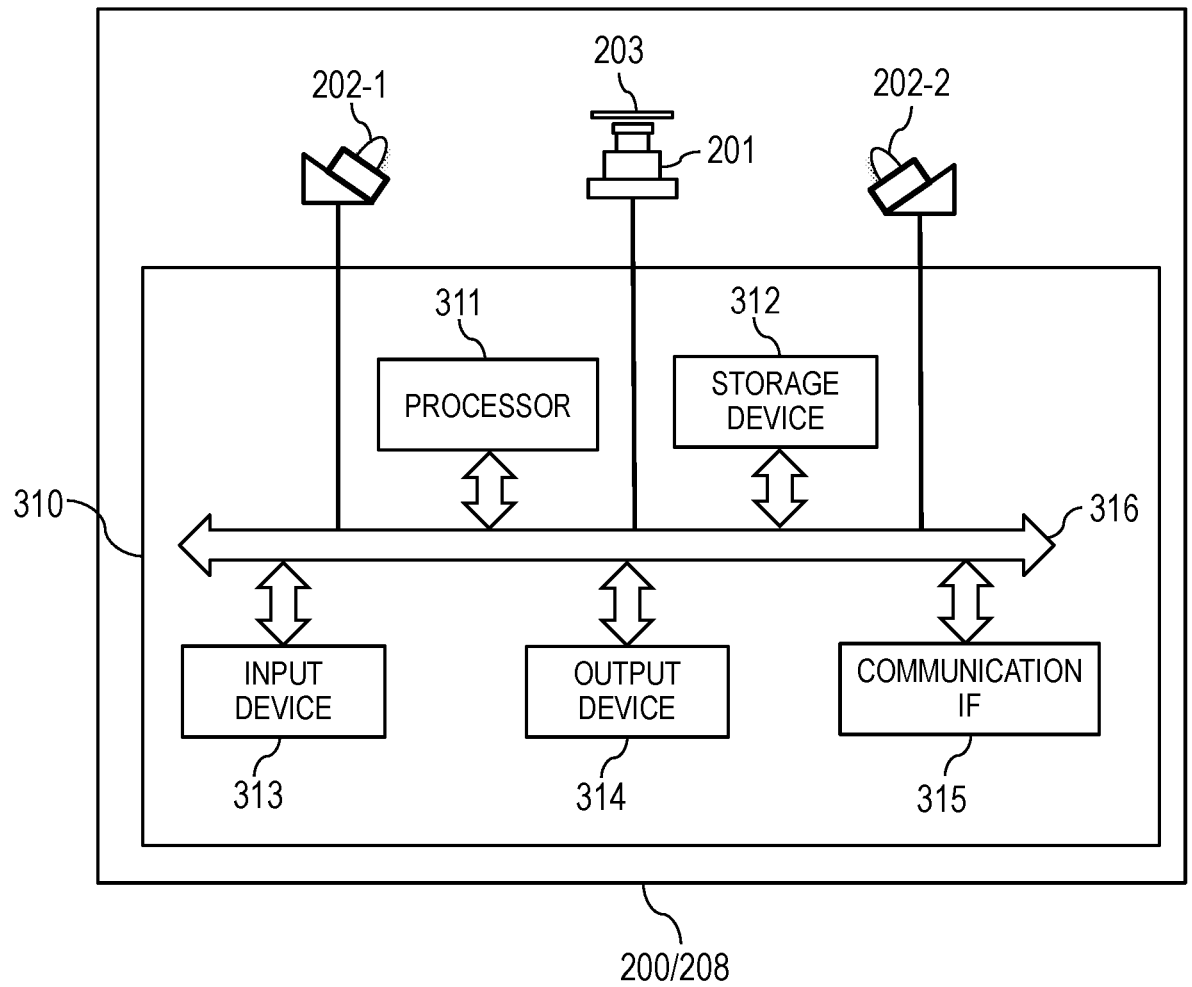
FIG. 4 is a block diagram for illustrating Block Configuration Example 2 of the photographing apparatus and the authentication apparatus according to the first embodiment.

FIG. 4 is a block diagram for illustrating Block Configuration Example 2 of the photographing apparatus 200 and the authentication apparatus 208 according to the first embodiment. The photographing apparatus 200 and the authentication apparatus 208 illustrated in FIG. 4 includes the computer 310. The data memory 206 is implemented by the storage device 312. The light source control module 300 is implemented by causing the processor 311 to execute the program stored in the storage device 312. Further, the authentication function is implemented by causing the processor 311 to execute the program stored in the storage device 312. The apparatus is the photographing apparatus 200 when the computer 310 has no authentication function, and the apparatus is the authentication apparatus 208 when the computer 310 has an authentication function.

In a stage prior to the authentication, the computer 310 may register a user ID and a personal identification number in association with the finger image data Is of the user in the storage device 312 by receiving the user ID and the personal identification number via the input device 313, or wirelessly receiving the user ID and the personal identification number from an IC chip or a communication terminal possessed by the user via the communication IF 315.

Further, the computer 310 may identify the finger image data Is associated with the user ID and the personal identification number, which is stored in the storage device 312, by acquiring the user ID and the personal identification number via the input device 313 or the communication IF 315 as described above, and the finger image data Is, to thereby authenticate both sets of finger image data Is (what is called 1:1 authentication). More precise authentication is achieved by identifying the user ID from the personal identification number in a stage prior to the authentication, and subsequently executes authentication with use of the finger image data Is that is associated with the user ID. The computer 310 may identify the finger image data Is that matches currently input finger image data Is from sets of finger image data stored in the storage device 312 (what is called 1:N authentication).

The irradiation light from the light sources 202 in FIG. 2 to FIG. 4 include beams of light of a plurality of wavelengths different from one another. In the case in which the blood vessels of the fingers are to be photographed, the irradiation light from the light sources 202 is, for example, near-infrared light. As light for acquiring biometric information of a skin surface such as fingerprints through photography, light having a wavelength of, for example, blue light or green light is usable. The beams of irradiation light from the light sources 202 which have a plurality of wavelengths are controllable independently of one another so that the amount of irradiated light is adjusted for each beam. Accordingly, beams of irradiation light from the light sources 202 which have a plurality of wavelengths can concurrently irradiate a subject, and can also irradiate separately from one another so that a subject is irradiated at different wavelengths at different times.

<Biometric Image Photographing Processing>

Figure 5:
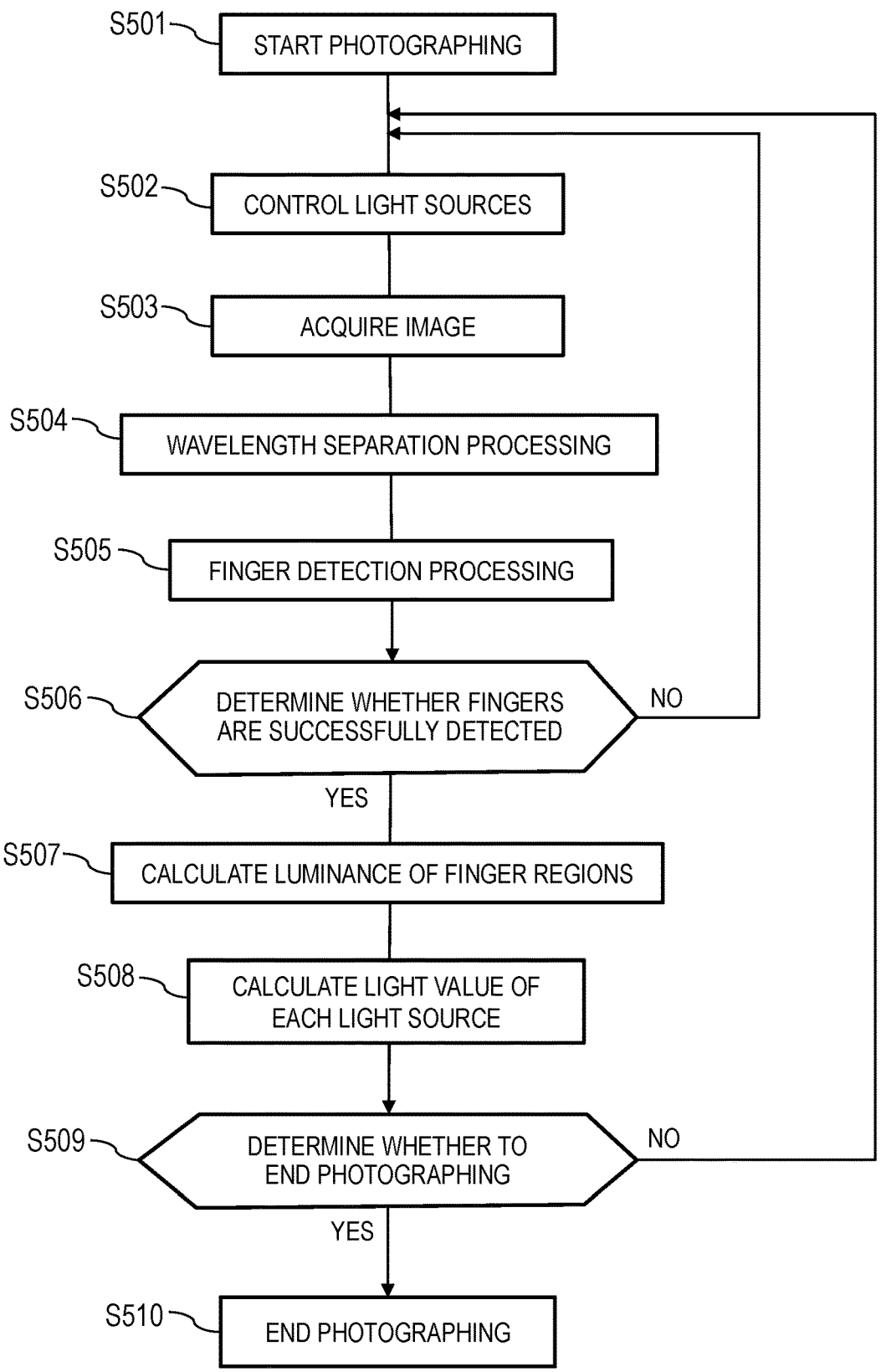
FIG. 5 is a flow chart for illustrating an example of steps of biometric image photographing processing in the first embodiment.

FIG. 5 is a flow chart for illustrating an example of steps of biometric image photographing processing in the first embodiment. In FIG. 5, the authentication apparatus 208 is an executor of the processing. However, that is an example and the photographing apparatus 200 may serve as the executor.

The photographing processing starts in Step S501 and, in Step S502, the authentication apparatus 208 controls the light sources 202 by light source control to execute irradiation with light. For the irradiation, the light sources 202 irradiate beams of light of a plurality of wavelengths at the same time.

Next, the authentication apparatus 208 photographs an image in Step S503 and executes, for the image data Is acquired as a result, wavelength separation processing in Step S504. The image data Is consequently separated into a plurality of pieces of wavelength separation image data, here, Ii and Ic, which correspond to components of the irradiated beams of light of a plurality of wavelengths. Although an example of separation into two pieces of wavelength separation image data is described here, another wavelength may be set for separation into three pieces of wavelength separation image data. For example, wavelength separation image data corresponding to a wavelength of blue light may be used to increase types of living body features and thus raise precision of authentication.

In Step S505, the authentication apparatus 208 next executes image processing for the image data Is acquired in Step S503 and for the pieces of wavelength separation image data Ii and Ic generated in Step S504, to thereby execute finger detection processing. Processing in which a hand region is digitized by executing threshold processing for luminance of each pixel of image data, and fingers are detected based on shapes drawn by contour lines of the digitized image data can be given as an example of the finger detection processing.

The authentication apparatus 208 determines, in finger detection determination of Step S506, whether fingers have been detected, based on a result of the finger detection processing of Step S505. When it is determined in the finger detection determination (Step S506) that no fingers have been detected (Step S506: No), the process returns to the light source control of Step S402 in order to repeat the finger detection processing.

When it is determined that fingers have been detected (Step S506: Yes), on the other hand, the process proceeds to processing of calculating luminance of finger regions in Step S507, and the authentication apparatus 208 calculates luminance in the finger regions of the image data Is acquired in Step S503 and of the wavelength separation image data Ii and Ic generated in Step S504.

In Step S508, the authentication apparatus 208 calculates, based on the luminance of the finger regions that have been calculated in Step S507, for each of the plurality of light sources 202, a light value to be used the next time photographing is executed.

In photographing end determination of Step S509, the authentication apparatus 208 determines whether to end the photographing depending on, for example, whether authentication is complete or whether time out of a photographing time has occurred. When it is determined that the photographing is to be ended (Step S509: Yes), the authentication apparatus 208 ends the photographing in Step S510. When it is determined that the photographing is not to be ended (Step S509: No), the process returns to Step S502 in order to repeat the light source control.

In the light source control of Step S502, when there is the light value calculated in Step S508 for each of the light sources 202, the authentication apparatus 208 controls each of the light sources 202 so that the controlled light source irradiates at the calculated light value. The authentication apparatus 208 then executes the image acquisition of Step S503.

In the calculation of the luminance of the finger regions of Step S507, the authentication apparatus 208 acquires luminance information of the finger regions detected by the finger detection processing of Step S505, in particular, a region from which living body features are to be extracted, with respect to the image data Is including RGB components which has been photographed in Step S503 and the plurality of pieces of wavelength separation image data Ii and Ic which have been generated in Step S504.

The luminance information is, for example, an average luminance value of pixels in the finger regions, in particular, a region from which living body features are to be extracted. When a plurality of fingers are detected, average luminance of every detected finger region may be used as the luminance information. Luminance in some of the finger regions may be too high or too low due to large individual differences between living bodies or large variations in the posture of a hand.

When it is difficult to uniformly adjust the luminance of every finger to a value within an appropriate range as in this case, the authentication apparatus 208 may exclude some of the fingers from the calculation of the luminance, to thereby avoid a drop in precision of authentication. For example, out of the plurality of fingers that have been detected, the authentication apparatus 208 excludes any finger having a luminance value equal to or higher than an upper limit luminance at which luminance saturation has occurred, and any finger having a luminance value equal to or lower than a lower limit luminance, and executes the light value calculation of Step S508 for each of the light sources 202 by using average luminance in the finger regions of the rest of the fingers. In this manner, even when it is difficult to adjust the luminance of every finger region to a luminance value within an appropriate range, high precision of authentication can be maintained by excluding some of the fingers and bringing the luminance to a value within an appropriate range for the rest of the fingers.

The appropriate range is, for example, a predetermined range from an upper limit value of the luminance at which the luminance is free from saturation (upper limit luminance) to a lower limit value of the luminance at which biometric information is not lost (lower limit luminance). The lower limit luminance can be, for example, a lower limit of a luminance range in which a contrast between light and dark is satisfactorily observable in a blood vessel region in image data.

For the calculation of the light value of each of the light sources 202 in Step S508, luminance Lr, luminance Lg, and luminance Lb of the R-component image data Ir, the G-component image data Ig, and the B-component image data Ib, which are pieces of color-component image data of the RGB image data Is acquired by photographing a subject irradiated with beams of light of a plurality of wavelengths at the same time, and luminance Li of the wavelength separation image data Ii and luminance Lc of the wavelength separation image data Ic are used as the luminance information.

The authentication apparatus 208 adjusts the amount of light so that, out of the pieces of color-component image data of the RGB image data Is of the photographed fingers, the luminance Lg of the color-component image data in which a sum of sensitivities to the concurrently irradiated beams of light of different wavelengths is maximum (for example, the luminance Lg of the image data Ig) takes a value within the appropriate range. The authentication apparatus 208 then adjusts the light value of each of the light sources 202 with respect to the wavelength separation image data Ii and the wavelength separation image data Ic as well so that the luminance Li and the luminance Lc each take a value within the appropriate range.

In the following description, the beams of irradiation light of the light sources 202 are near-infrared light and green light. The description gives an example of how the light value is calculated for each of the light sources 202 (Step S508) with use of the RGB image data Is acquired by the imaging unit 201 having sensitivities to near-infrared light and visible light, when beams of light of those two wavelengths are irradiated from the light sources 202 to irradiate fingers at the same time.

The luminance Lr, the luminance Lg, and the luminance Lb of pixels in the finger regions of the R-component image data Ir, the G-component image data Ig, and the B-component image data Ib, which are pieces of color-component image data of the RGB image data Is acquired by photographing, can be expressed as functions of the luminance Li and the luminance Lc of pixels in the wavelength separation image data Ii and the wavelength separation image data Ic of the near-infrared light and the green light irradiated from the light sources 202, by Expressions (1) to (3).

$$Lr = Fr(Li, Lc) \tag{1}$$

$$Lg = Fg(Li, Lc) \tag{2}$$

$$Lb = Fb(Li, Lc) \tag{3}$$

Functions Fr, Fg, and Fb are functions having, as inputs, the luminance Li and the luminance Lc of pixels in the finger regions of the wavelength separation image data Ii and the wavelength separation image data Ic. The wavelength separation image data Ii and the wavelength separation image data Ic are acquired by the wavelength separation processing (Step S504) executed by the authentication apparatus 208 based on the luminance Lr, the luminance Lg, and the luminance Lb of pixels in the finger regions of the R-component image data Ir, the G-component image data Ig, and the B-component image data Ib, which are pieces of color-component image data of the RGB image data Is. The luminance Li and the luminance Lc of pixels in the finger regions of the wavelength separation image data Ii and the wavelength separation image data Ic can be expressed as functions of a near-infrared light amount Qi and a green light amount Qc of the near-infrared light and the green light irradiated from the light sources 202, by Expressions (4) and (5), respectively.

$$Li = Fi(Qi) \tag{4}$$

$$Lc = Fc(Qc) \tag{5}$$

Functions Fi and Fc are a function having a value of the near-infrared light amount Qi as an input and a function having a value of the green light amount Qc as an input, respectively. The authentication apparatus 208 solves a simultaneous equation of Expressions (1) to (3) with the use of the luminance Lr, the luminance Lg, and the luminance Lb of pixels in the finger regions of the R-component image data Ir, the G-component image data Ig, and the B-component image data Ib, which are pieces of color-component image data of the RGB image data Is, to thereby obtain two unknowns that are the luminance Li and the luminance Lc of pixels in the finger regions of the wavelength separation image data Ii and the wavelength separation image data Ic.

The authentication apparatus 208 obtains, from Expressions (4) and (5), relationships of the irradiation light amounts Qi and Qc of beams of light having two wavelengths to the luminance Li of the wavelength separation image data Ii and the luminance Lc of the wavelength separation image data Ic. The authentication apparatus 208 then adjusts the irradiation light amounts (Qi and Qc) of the light sources 202 so that the luminance Lr, the luminance Lg, and the luminance Lb of pixels in the R-component image data Ir, the G-component image data Ig, and the B-color-component image data Ib, which are measured image data of R, G, and B components are within the appropriate range, and so that the luminance Li of the wavelength separation image data Ii and the luminance Lc of the wavelength separation image data Ic each take a predetermined luminance value. The predetermined luminance value is, for example, a value between the upper limit luminance at which the luminance is free from saturation and the lower limit luminance at which a light-dark contrast in luminance is satisfactorily observable in a blood vessel region or other living body regions.

The luminance Li and the luminance Lc in Expressions (4) and (5) may be representative values (average values, maximum values, minimum values, median values, or mode values) of pixels in the finger regions.

For example, it is assumed that, out of the pieces of color-component image data Ir, Ig, and Ib, the sum of the sensitivities to the near-infrared light and the green light irradiated from the light sources 202 to irradiate the fingers at the same time is maximum in the G-component image data Ig. When the fingers concurrently irradiated with the near-infrared light and the green light from the light sources 202 are photographed, the luminance Lg of the G-component image data Ig is highest and accordingly easily falls into a state that causes a loss of biometric information such as luminance saturation. With the biometric information of the G-component image data Ig being lost, it is a possibility that a loss of biometric information occurs also in the wavelength separation image data Ii and the wavelength separation image data Ic, which are generated with use of the G-component image data Ig.

To address this possibility, the authentication apparatus 208 adjusts the irradiation light amounts (Qi and Qc) of the light sources 202 so that the luminance of at least a piece of color-component image data in which the sum of sensitivities to the plurality of beams of light irradiated from the light sources 202 is maximum (in this example, the G-component image data Ig) is contained within the appropriate range, and so that the luminance Li of the wavelength separation image data Ii and the luminance Lc of the wavelength separation image data Ic each take a predetermined luminance value as well. The wavelength separation image data Ii and the wavelength separation image data Ic that are clear are thus acquired. The predetermined luminance value can be, for example, a value between the upper limit luminance at which the luminance is free from saturation and the lower limit luminance at which a light-dark contrast in luminance is satisfactorily observable in a blood vessel region or other living body regions.

In the example in which the G-component image data Ig is maximum in terms of the sum of sensitivities to the near-infrared light and the green light irradiating the fingers at the same time, the authentication apparatus 208 uses at least the luminance Lg of the G-component image data Ig to adjust the amounts of light of the light sources 202. In this case, the authentication apparatus 208 may additionally use the luminance Lr of the R-component image data Ir and the luminance Lb of the B-component image data Ib to adjust the amounts of light of the light sources 202. The wavelength separation image data Ii and the wavelength separation image data Ic that are clearer can be acquired by setting all of the luminance Lr, the luminance Lg, and the luminance Lb of the pieces of color-component image data Ir, Ig, and Ib of the RGB image data Is required to generate the wavelength separation image data Ii and the wavelength separation image data Ic to values within the appropriate range.

Next, description is given of an example of a light source control method used when it is assumed that the luminance Lr, the luminance Lg, and the luminance Lb of the pieces of color-component image data Ir, Ig, and Ib acquired from the measured RGB image data Is can be expressed by linear combination of the luminance Li and the luminance Lc of the plurality of pieces of wavelength separation image data Ii and Ic. The luminance Lr, the luminance Lg, and the luminance Lb of the pieces of color-component image data Ir, Ig, and Ib are assumed to have linearity with the luminance Li and the luminance Lc of the pieces of wavelength separation image data Ii and Ic, which correspond to the near-infrared component and the green light component irradiated from the light sources 202, and can accordingly be expressed by Expressions (6) to (8).

$$Lr = Ar \times (\alpha R \times Li + \beta R \times Lc) \quad (6)$$

$$Lg = Ag \times (\alpha G \times Li + \beta G \times Lc) \quad (7)$$

$$Lb = Ab \times (\alpha B \times Li + \beta B \times Lc) \quad (8)$$

In Expressions (6) to (8), Ar, Ag, and Ab are coefficients each of which can take any value. Values αR, αG, and αB are known coefficients indicating light reception sensitivities to light of the color components R, G, and B of the RGB image data Is acquired by the imaging unit 201 by photographing at the wavelength of the near-infrared light. Values βR, βG, and βB are known coefficients indicating light reception sensitivities to light of the color components R, G, and B of the RGB image data Is at the wavelength of the green light. A relationship between the luminance Li of the wavelength separation image data Ii of the near-infrared light and the near-infrared light amount Qi can be expressed by Expression (9), and a relationship between the luminance Lc of the wavelength separation image data Ic of the green light and the green light amount Qc can be expressed by Expression (10).

$$Li = \alpha \times Qi \quad (9)$$

$$Lc = \beta c \times Qc \quad (10)$$

A value αi is a coefficient indicating the relationship between the near-infrared light amount Qi and the luminance Li of the wavelength separation image data Ii. A value βc is a coefficient indicating the relationship between the green light amount Qc and the luminance Lc of the wavelength separation image data Ic. The near-infrared light amount Qi and the green light amount Qc are known values that can be read as the light values of the light sources 202 that have been set in the authentication apparatus 208 in the measurement of the luminance Li and the luminance Lc. The coefficient αi can be obtained by Expression (9) from the relationship between the near-infrared light amount Qi and the measured luminance Li, and the coefficient βc is obtained by Expression (10) from the relationship between the green light amount Qc and the measured luminance Lc.

The authentication apparatus 208 solves a simultaneous equation of Expressions (6) to (8) with use of the luminance Lr, the luminance Lg, and the luminance Lb of the pieces of color-component image data Ir, Ig, and Ib of the measured RGB image data Is, and the known light reception sensitivities αR, αG, αB, βR, βG, and βB to the color components R, G, and B of the RGB image data Is, to thereby obtain two unknowns that are the luminance Li of the wavelength separation image data Ii and the luminance Lc of the wavelength separation image data Ic.

The authentication apparatus 208 uses the relationships expressed by Expressions (9) and (10) to obtain the coefficient αi from a relationship between the near-infrared light amount Qi set in a current photographing frame and the luminance Li obtained by solving the simultaneous equation of Expressions (6) to (8), and to obtain the coefficient βc from a relationship between the green light amount Qc and the luminance Lc obtained by solving the simultaneous equation of Expressions (6) to (8).

In the next photographing frame, the authentication apparatus 208 ensures that the calculated luminance Li of the wavelength separation image data Ii and the calculated luminance Lc of the wavelength separation image data Ic each take a predetermined luminance value by adjusting the near-infrared light amount Qi and the green light amount Qc, respectively. The predetermined luminance value is, for example, a value at which a light-dark contrast in luminance is satisfactorily observable in a blood vessel region or other living body regions. The authentication apparatus 208 adjusts the irradiation light amounts (Qi and Qc) of the light sources 202 in the next photographing frame so that the G-component image data Ig, which is maximum (maximum in ($\alpha$G+$\beta$G)) in terms of the sum of color component-by-color component light reception sensitivities {($\alpha$R+$\beta$R), ($\alpha$G+$\beta$G), ($\alpha$B+$\beta$B)} to light having wavelengths of at least two light sources 202, has luminance within an appropriate range in which the luminance is free from saturation, and so that the luminance Li of the wavelength separation image data Ii and the luminance Lc of the wavelength separation image data Ic each take a value within the appropriate range. The luminance within the appropriate range is, for example, between the upper limit luminance at which the luminance is free from saturation and the lower limit luminance at which a light-dark contrast in luminance is satisfactorily observable in a blood vessel region or other living body regions.

In this manner, the luminance Li of the wavelength separation image data Ii and the luminance Lc of the wavelength separation image data Ic can each take a luminance value within the appropriate range, and prevention of luminance saturation in the G-component image data Ig, which is prone to luminance saturation, is accomplished at the same time. Clarity of the pieces of wavelength separation image data Ii and Ic can be enhanced even more by executing light source control so that not only the G-component image data Ig but also the R-component image data Ir and the B-component image data Ib each have luminance within the appropriate range as the luminance Lr and the luminance Lb.

Next, an example of a method of executing light source control more efficiently by simplifying the relationship between beams of light of a plurality of wavelengths irradiated from the light sources 202 and the RGB image data Is acquired through photographing. As in the description given above, the authentication apparatus 208 uses the light sources 202 to irradiate the fingers with near-infrared light and green light serving as irradiation light at the same time, and uses the imaging unit 201 which has sensitivities to near-infrared light and visible light to acquire the RGB image data Is through photographing.

An assumption here is that, as features of sensitivity characteristics regarding the pieces of color-component image data Ir, Ig, and Ib, which correspond to the RGB color components, the imaging unit 201 has substantially equal sensitivities to the near-infrared light in all of the R-component image data Ir, the G-component image data Ig, and the B-component image data Ib.

It is also assumed here that the imaging unit 201 has the highest sensitivity to the green light in the G-component image data Ig, and has a substantially zero sensitivity to the green light in the R-component image data Ir.

Under those assumptions, $\alpha$R and $\alpha$G can be regarded to be approximately equal to each other ($\alpha$R$\approx$$\alpha$G) in Expressions (6) and (7), and $\beta$R can be regarded to be approximately 0 ($\beta$$\approx$0) in Expression (6). When Ar and Ag which are arbitrary variables are set to 1 (Ar=Ag=1), the luminance Lr of the R-component image data Ir expressed by Expression (6) can be expressed solely by the luminance Li of the wavelength separation image data Ii as in Expression (11), and the G-component image data Ig expressed by Expression (7) can be expressed in the form of linear combination of the luminance Li of the wavelength separation image data Ii and the luminance Lc of the wavelength separation image data Ic as in Expression (12).

$$Lr = \alpha R \times Li \quad (11)$$

$$Lg = \alpha R \times Li + \beta G \times Lc \quad (12)$$

For the G-component image data Ig in which the luminance is higher than in the R-component image data Ir due to sensitivities to both of the wavelengths of the near-infrared light and the green light concurrently irradiating the fingers, the authentication apparatus 208 controls the amounts of light of the light sources 202 so that the luminance Li of the wavelength separation image data Ii and the luminance Lc of the wavelength separation image data Ic are within an appropriate range in which the luminance is free from saturation, to thereby set the near-infrared light amount Qi and the green light amount Qc anew.

In this example, only the near-infrared light is sensed at the sensitivity $\alpha$R in the R-component image data Ir and, accordingly, the authentication apparatus 208 first obtains the luminance Li from the measured luminance Lr and the known coefficient $\alpha$R, based on Expression (11). The authentication apparatus 208 next obtains the coefficient ai from the relationship between the near-infrared light amount Qi set in the current photographing frame and the luminance Li obtained by Expression (11), based on Expression (9). The authentication apparatus 208 determines, based on the coefficient ai obtained by Expression (9) and on Expression (11), the near-infrared light amount Qi in the next photographing frame so that the luminance Li of the wavelength separation image data Ii and the luminance Lr of the R-component image data Ir are within a predetermined range of luminance.

The authentication apparatus 208 can obtain, by first obtaining the sensitivity $\alpha$R indicating a relationship between the luminance Lr of the R-component image data Ir and the luminance Li of the wavelength separation image data Ii with use of Expression (11), the sensitivity $\beta$G indicating a relationship between the luminance Lg of the G-component image data Ig and the luminance Lc of the wavelength separation image data Ic, with influence of the wavelength separation image data Ii removed in Expression (12).

The authentication apparatus 208 next calculates the amount of light of the green light based on Expression (12) and Expression (10), with use of the luminance Lg of the G-component image data Ig and the luminance Lc of the wavelength separation image data Ic. To give a specific example, the authentication apparatus 208 calculates the green light amount Qc at which the luminance Lg of the G-component image data Ig is contained within an appropriate range and the luminance Lc of the wavelength separation image data Ic takes a predetermined luminance value within an appropriate range, based on Expression (12) and Expression (10). The predetermined luminance value can be, for example, a value between the upper limit luminance at which the luminance is free from saturation and the lower limit luminance at which a light-dark contrast in luminance is satisfactorily observable in a blood vessel region or other living body regions.

In this manner, even when a subject irradiated with beams of light of two wavelengths at the same time is photographed, simplification of relationships between the RGB image data Is of the subject and the wavelengths of the irradiating beams of light enables the authentication apparatus 208 to execute light source control for near-infrared light and for green light separately, and efficiently control the amount of light of each of the wavelengths.

It is presumed that the relationships of the luminance Lr, the luminance Lg, and the luminance Lb of the pieces of color-component image data Ir, Ig, and Ib, the luminance Li of the wavelength separation image data Ii, and the luminance Lc of the wavelength separation image data Ic to the irradiation light amounts of the light sources 202 described with reference to Expressions (1) to (12) change in real time with changes in position and posture of fingers presented to the authentication apparatus 208.

Accordingly, the relationships of Expressions (1) to (12) are calculated for each of the pieces of color-component image data Ir, Ig, and Ib and the pieces of wavelength separation image data Ii and Ic that are acquired from the same frame (RGB image data Is) out of frames photographed in succession. After calculating the relationships of Expressions (1) to (12) for every frame, the authentication apparatus 208 adjusts the amount of light of each of the light sources 202 in the photographing of the next frame so that the pieces of color-component image data Ir, Ig, and Ib and the pieces of wavelength separation image data Ii and Ic that are clear can be acquired.

The pieces of color-component image data Ir, Ig, and Ib and the pieces of wavelength separation image data Ii and Ic that are clear can thus be acquired in response to changes in position and posture of the fingers by updating, in real time, the relationships of the luminance Lr, the luminance Lg, and the luminance Lb of the pieces of color-component image data Ir, Ig, and Ib, the luminance Li of the wavelength separation image data Ii, and the luminance Lc of the wavelength separation image data Ic to the irradiation light amounts of the light sources 202, and using the updated relationships in calculation.

Next, description is given of a calculation method in which relationships of the luminance Lr, the luminance Lg, and the luminance Lb of the pieces of color-component image data Ir, Ig, and Ib, the luminance Li of the wavelength separation image data Ii, and the luminance Lc of the wavelength separation image data Ic to the irradiation light amounts of the light sources 202 are obtained for each of the frames photographed in succession, and the obtained relationships are used to calculate the irradiation light amounts of the light sources 202 in photographing of the next frame.

Here, a case in which the luminance Lr of the R-component image data Ir can be expressed by Expression (11) and the luminance Lg of the G-component image data Ig can be expressed by Expression (12) is described as an example. It is understood from Expression (11) that the luminance Lr of the R-component image data Ir is in proportion to the luminance Li of the wavelength separation image data Ii of the near-infrared light, and, according to Expression (9), the luminance Li of the wavelength separation image data Ii has a proportional relationship with the near-infrared light amount Qi. The luminance Lr of the R-component image data Ir accordingly has a proportional relationship with the near-infrared light amount Qi.

Accordingly, average luminance Lrav of the luminance Lr in the finger regions in the R-component image data Ir is calculated, and a coefficient "a" (proportionality constant) is obtained from a relationship "Lrav=a×(near-infrared light amount Qi)." It is understood from Expression (11) that the luminance Lr of the R-component image data Ir and the luminance Li of the wavelength separation image data Ii have a linearity relationship. Objective luminance TLi is accordingly set for the luminance Li of the wavelength separation image data Ii in advance and, from the relationship between the luminance Lr of the R-component image data Ir and the luminance Li of the wavelength separation image data Ii, the luminance Lr of the R-component image data Ir at which the luminance Li of the wavelength separation image data Ii reaches the objective luminance TLi is determined as objective luminance TR.

Figure 6:
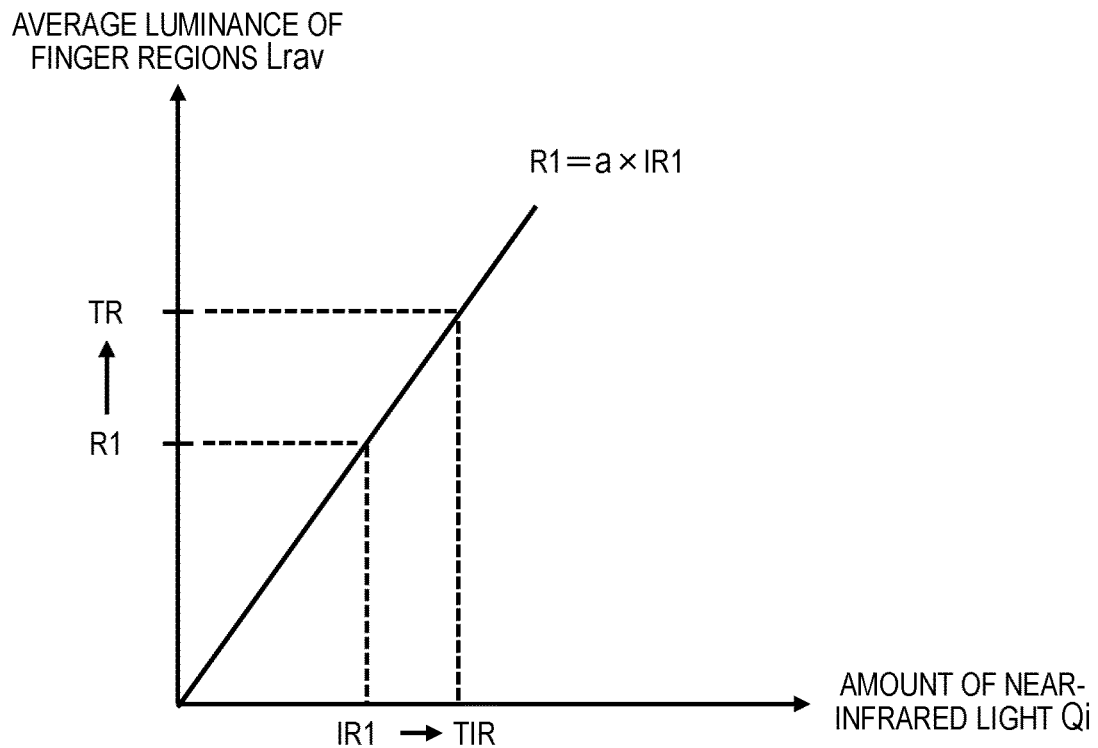
FIG. 6 is a graph for showing a relationship between the near-infrared light amount Qi and the luminance Lr of the R-component image data Ir.

FIG. 6 is a graph for showing a relationship between the near-infrared light amount Qi and the luminance Lr of the R-component image data Ir. As shown in FIG. 6, a relationship between the near-infrared light amount Qi that is IR1 (Qi=IR1) and the average luminance Lrav in the finger regions of the R-component image data Ir measured when the fingers are irradiated with the near-infrared light in an amount of light of IR1 which is R1 (Lrav=R1) can be linearly approximated (R1=a×IR1). The authentication apparatus 208 deduces from this relationship that the near-infrared light amount Q1 for bringing the luminance Lr of the R-component image data Ir to the objective luminance TR is TIR, and can set TIR as the irradiation light amount to be used the next time photographing is executed.

The authentication apparatus 208 next adjusts the green light amount Qc. Subtraction of Expression (11) from Expression (12) yields Expression (13).

$$Lg-Lr=\beta G \times Lc \quad (13)$$

A difference (Lg−Lr) between the luminance Lg of the G-component image data Ig and the luminance Lr of the R-component image data Ir is in proportion to the luminance Lc of the green light wavelength separation image data Ic, and, according to Expression (10), the luminance Lc of the wavelength separation image data Ic is in proportion to the green light amount Qc. It is accordingly understood that the difference (Lg−Lr) between the luminance Lg of the G-component image data Ig and the luminance Lr of the R-component image data Ir is in proportion to the green light amount Qc.

In other words, when the luminance difference (Lg−Lr) in the finger regions between the G-component image data Ig and the R-component image data Ir is given as Day, a coefficient "b" (proportionality constant) is obtained from a relationship "Dav=b×(green light amount Qc)." The relationship of the difference (Lg−Lr) between the measured luminance Lg of the G-component image data Ig and the measured luminance Lr of the R-component image data Ir to the green light amount Qc is thus obtained based on Expression (13) and Expression (10). This enables the authentication apparatus 208 to adjust the green light amount Qc so that the luminance Lg of the G-component image data Ig and the luminance Lc of the wavelength separation image data Ic have appropriate magnitude.

To give a specific example, objective luminance TLc at which the luminance Lg of the G-component image data Ig is contained within an appropriate range and the luminance Lc of the wavelength separation image data Ic is within an appropriate range as well is set in advance. The relationship of the luminance difference Day between the luminance Lg of the G-component image data Ig and the luminance Lr of the R-component image data Ir to the luminance Lc of the wavelength separation image data Ic is used to determine, as an objective luminance difference value TD, a value of the luminance difference Day between the luminance Lg of the G-component image data Ig and the luminance Lr of the R-component image data Ir at which the luminance Lc of the wavelength separation image data Ic is the objective luminance TLc.

Figure 7:
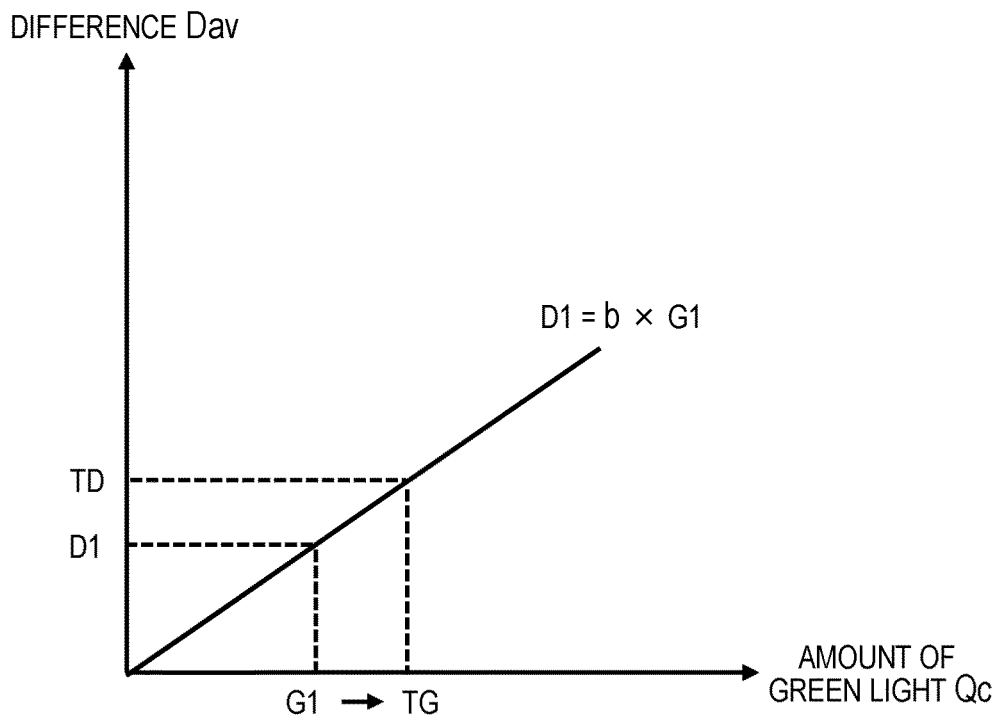
FIG. 7 is a graph for showing a relationship between the green light amount Qc and the luminance difference Dav.

FIG. 7 is a graph for showing a relationship between the green light amount Qc and the luminance difference Day. As shown in FIG. 7, a luminance value difference D1 is the value of a luminance difference in the finger regions of the G-component image data Ig and the R-component image data Ir that is measured when the green light amount Qc is G1 (Qc=G1), and a relationship between the luminance difference value D1 and the green light amount value G1 can be linearly approximated (D1=b×G1). From this relationship, the authentication apparatus 208 deduces an objective value TG of the green light amount Qc for bringing the luminance difference Day between the luminance Lg of the G-component image data Ig and the luminance Lr of the R-component image data Ir to the objective luminance difference value, and uses the deduced value as an irradiation light amount the next time photographing is executed.

The authentication apparatus 208 thus obtains a light amount value to be used in photographing of the next frame, for the near-infrared light amount Qi first and then for the green light amount Qc, and executes light source control based thereon. This enables the authentication apparatus 208 to acquire the pieces of color-component image data Ir, Ig, and Ib and the pieces of wavelength separation image data Ii and Ic that are clear despite changes in position and posture of the fingers by accommodating the changes.

In the example given here, a case in which the luminance Lr, the luminance Lg, and the luminance Lb of the pieces of color-component image data Ir, Ig, and Ib have linearity with the luminance Li of the wavelength separation image data Ii and the luminance Lc of the wavelength separation image data Ic, and light amount calculation can be simplified by approximation of some of those relationships is described. However, it goes without saying that, even when the luminance Lr, the luminance Lg, and the luminance Lb of the pieces of color-component image data Ir, Ig, and Ib do not have a linearity relationship with the luminance Li of the wavelength separation image data Ii and the luminance Lc of the wavelength separation image data Ic in Expressions (1) to (5), light source control that accommodates changes in position and posture of the fingers is executable by obtaining, for each frame, relationships of the light amount values of the light sources 202 to the luminance Lr, the luminance Lg, and the luminance Lb of the pieces of color-component image data Ir, Ig, and Ib, the luminance Li of the wavelength separation image data Ii, and the luminance Lc of the wavelength separation image data Ic.

Second Embodiment

A second embodiment of this invention is an example of executing light source control in order to achieve high authentication precision when simultaneous adjustment of all pieces of wavelength separation image data, here, Ii and Ic, to luminance values within an appropriate range is inexecutable in the first embodiment. Components that are the same as the components in the first embodiment are denoted by the same reference symbols, and description thereof is omitted.

In the first embodiment, the authentication apparatus 208 controls the irradiation light amount of each light source so that the plurality of pieces of wavelength separation image data Ii and Ic generated from the RGB image data Is, which is acquired by photographing fingers irradiated with beams of light of a plurality of wavelengths at the same time, are clear. When this control is aimed to bring all pieces of wavelength separation image data Ii and Ic to objective luminance values at the same time, luminance saturation may occur in some of the pieces of color-component image data of the RGB image data Is due to individual differences of the living body, a change in posture of the fingers, or the like.

Luminance saturation causes a loss of biometric information in the finger regions of the pieces of wavelength separation image data Ii and Ic, and consequently lowers the precision of authentication. In order to maintain high authentication precision, priority is given to bringing the luminance of a piece of wavelength separation image data that contributes to enhancement of precision in a greater proportion out of the plurality of pieces of wavelength separation image data Ii and Ic to an appropriate value. Even when not all of the plurality of pieces of wavelength separation image data Ii and Ic cannot be set to appropriate luminance values, high authentication precision can be maintained by preferentially bringing the luminance of a piece of wavelength separation image data that contributes to enhancement of precision in a greater proportion to an appropriate value.

Figure 8:
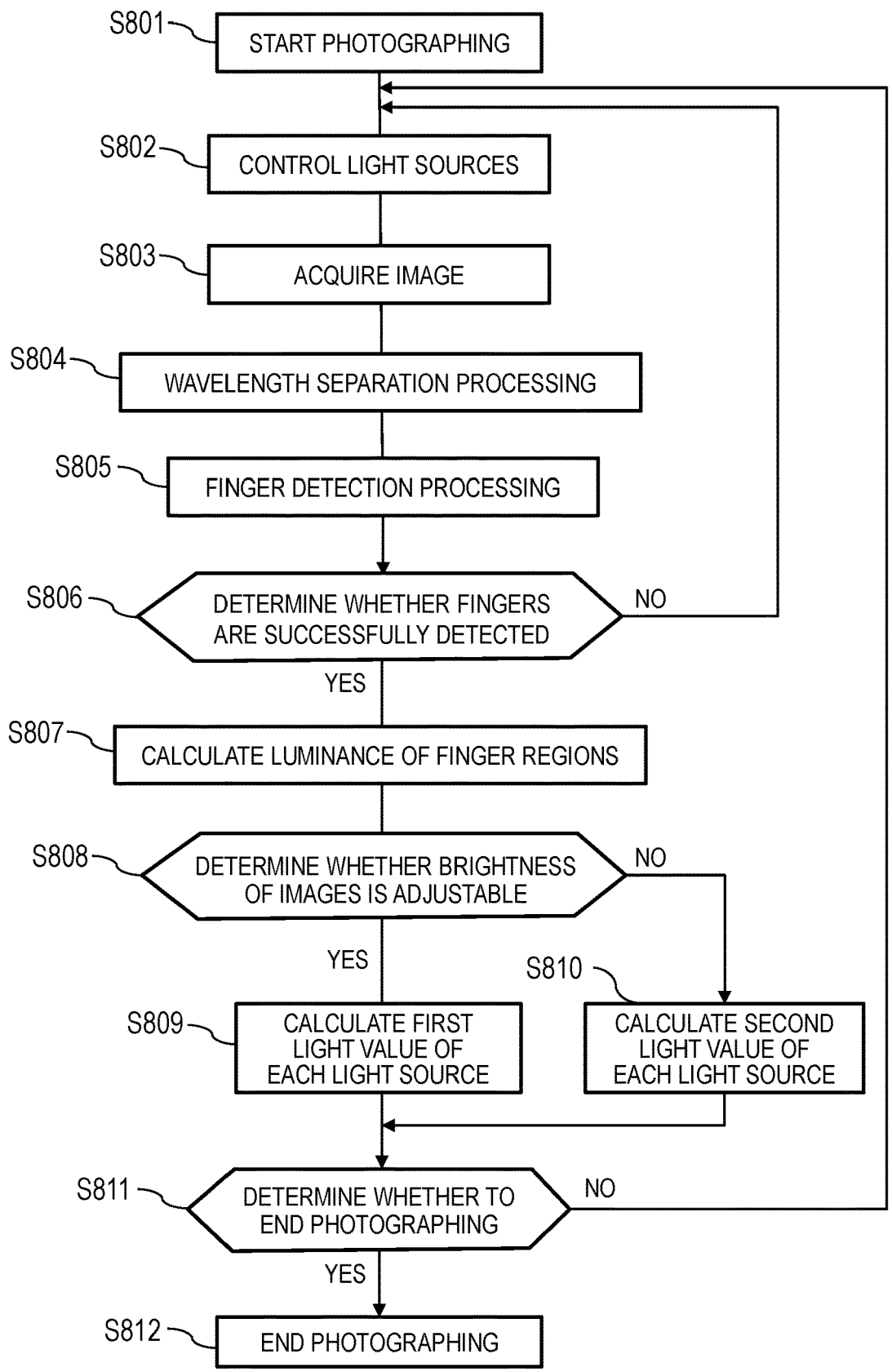
FIG. 8 is a flow chart for illustrating an example of steps of biometric image photographing processing in the second embodiment.

FIG. 8 is a flow chart for illustrating an example of steps of biometric image photographing processing in the second embodiment. In FIG. 8, the authentication apparatus 208 is an executor of the processing. However, that is an example and the photographing apparatus 200 may serve as the executor.

The photographing processing starts in Step S801 and, in Step S802, the authentication apparatus 208 controls the light sources 202 by light source control to execute irradiation with light. For the irradiation, the light sources 202 irradiates beams of light of a plurality of wavelengths at the same time. Next, the authentication apparatus 208 executes image photographing in Step S803 to acquire the image data Is, and executes wavelength separation processing for the image data Is in Step S804. In this manner, the authentication apparatus 208 generates a plurality of pieces of wavelength separation image data Ii and Ic by separating the image data Is acquired in the photographing of Step S803 by wavelength components of the plurality of wavelengths of the irradiated beams of light.

In Step S805, the authentication apparatus 208 next executes image processing for the image data Is acquired in Step S803 or for the pieces of wavelength separation image data Ii and Ic generated in Step S804, to thereby execute detection processing for the finger regions.

The authentication apparatus 208 determines, in finger detection determination of Step S806, whether fingers have been detected, based on a result of the finger detection processing of Step S805. When it is determined in the finger detection determination (Step S805) that no fingers have been detected (Step S806: No), the process returns to the light source control of Step S602 in order to repeat the finger detection processing.

When it is determined in the finger detection determination (Step S805) that fingers have been detected (Step S806: Yes), the process proceeds to processing of calculating luminance of finger regions in Step S807, and the authentication apparatus 208 calculates the luminance Lr, the luminance Lg, and the luminance Lb in the finger regions of the pieces of color-component image data Ir, Ig, and Ib of the image data Is acquired in Step S803, and the luminance Li and the luminance Lc in the finger regions of the pieces of wavelength separation image data Ii and Ic generated in Step S804.

In Step S808, the authentication apparatus 208 executes image data luminance adjustability determination, based on the luminance in the finger regions that has been calculated in Step S807 and the light values of the light sources 202. The authentication apparatus 208 then determines whether all of the pieces of wavelength separation image data Ii and Ic can simultaneously be adjusted by light source control to luminance values within an appropriate range.

When it is determined that all of the pieces of wavelength separation image data Ii and Ic are adjustable (Step S808: Yes), the process proceeds to Step S809 in which first light value calculation is executed for each light source. The authentication apparatus 208 then calculates, based on the luminance in the finger regions that has been calculated in Step S807, for each of the plurality of light sources 202, a light value to be used the next time photographing is executed so that the image data Is acquired in Step S803 and all pieces of the wavelength separation image data Ii and Ic have luminance values within an appropriate range.

When adjustment of the image data Is and all of the pieces of wavelength separation image data Ii and Ic is determined to be inexecutable (Step S808: No), the process proceeds to Step S810 in which second light value calculation is executed for each of the light sources 202 (Step S810). The authentication apparatus 208 then calculates, for each of the plurality of light sources 202, a light value to be used the next time photographing is executed so that the luminance of a piece of wavelength separation image data that contributes to enhancement of precision in a greater proportion is preferentially brought to a luminance value within an appropriate range.

The piece of wavelength separation image data to be given priority is determined based on a proportion of contribution to enhancement of precision that is acquired in advance from experiments. For example, an erroneous-authentication rate observed when the wavelength separation image data Ii is used and an erroneous-authentication rate observed when the wavelength separation image data Ic is used are acquired through experiments, and are stored in the storage device 312.

The authentication apparatus 208 acquires the erroneous-authentication rates from the storage device 312, and gives priority to the piece of wavelength separation image data that has a lower erroneous-authentication rate. The authentication apparatus 208 may use past authentication results (history information) to calculate a erroneous-authentication rate for each of the pieces of wavelength separation image data Ii and Ic, to overwrite the rates stored in the storage device 312. The authentication apparatus 208 thus acquires the latest erroneous-authentication rates from the storage device 312, and gives priority to the piece of wavelength separation image data that has a lower erroneous-authentication rate. Authentication that is higher in precision is accomplished in this manner.

In photographing end determination of Step S811, the authentication apparatus 208 determines whether to end the photographing depending on, for example, whether authentication is complete or whether time out of a photographing time has occurred. When it is determined that the photographing is to be ended (Step S811: Yes), the authentication apparatus 208 ends the photographing in Step S812. When it is determined that the photographing is not to be ended (Step S811: No), on the other hand, the process returns to Step S802, and the authentication apparatus 208 executes the light source control.

In the light source control of Step S802, when there is the light value calculated in Step S809 or Step S810 for each of the light sources 202, the authentication apparatus 208 controls each of the light sources 202 so that the controlled light source irradiates at the calculated light value. The authentication apparatus 208 then executes the image acquisition of Step S803.

In the image data luminance adjustability determination of Step S808, when the image data Is acquired in Step S803 is RGB image data and, for example, luminance reaches a level of saturation or drops to or lower than a threshold value in the finger regions of any of the pieces of color-component image data Ir, Ig, and Ib, the authentication apparatus 208 determines that it is inexecutable to simultaneously bring all of the pieces of wavelength separation image data Ii and Ic generated in Step S804 to luminance values within an appropriate range.

Even when every one of the pieces of color-component image data Ir, Ig, and Ib of the RGB image data Is acquired in Step S803 has luminance in an appropriate range, the luminance may reach a level of saturation or drop to or lower than the threshold value in one of the pieces of color-component image data Ir, Ig, and Ib of the RGB image data Is acquired in the next execution of photographing by irradiating beams of light from the light sources 202 at the light values calculated in the first light value calculation of Step S809. In this case also, the authentication apparatus 208 may determine that adjustment of the luminance of the image data is inexecutable.

In the image data luminance adjustability determination of Step S808, the authentication apparatus 208 can more accurately determine whether the luminance is adjustable by executing the determination for a plurality of frames photographed in succession. For example, when the first light value calculation for each light source of Step S809 is executed for a plurality of frames in succession, there is a case in which, although the RGB image data Is acquired by photographing and the generated pieces of wavelength separation image data Ii and Ic settle to approximately the same luminance values, luminance reaches a level of saturation or drops to or lower than the threshold value in some of the pieces of color-component image data of the RGB image data Is. In this case, the authentication apparatus 208 may determine that adjustment of the luminance of the image data is inexecutable.

The first light value calculation executed for each of the light sources 202 in Step S809 is light value calculation executed when all of the pieces of wavelength separation image data Ii and Ic are adjustable to luminance values within an appropriate range. This is accordingly the same as the light value calculation for each light source of Step S508 in the flow chart of FIG. 4 in the first embodiment, and description thereof is omitted in the second embodiment.

The second light value calculation executed for each of the light sources 202 in Step S810 is processing of adjusting the light value of the light sources 202 so that a piece of the wavelength separation image data that contributes to enhancement of precision in a greater proportion out of the plurality of pieces of wavelength separation image data Ii and Ic is preferentially brought to a luminance value within an appropriate range. Specifically, in order to generate the piece of wavelength separation image data to be given priority (priority image data) Ii or Ic and the other piece of wavelength separation image data Ii or Ic, the authentication apparatus 208 adjusts the amounts of light of the light sources 202 so that the luminance Lr, the luminance Lg, and the luminance Lb of the pieces of color-component image data Ir, Ig, and Ib of the RGB image data Is from which the pieces of wavelength separation image data are to be generated take luminance values within an appropriate range.

As for the luminance of the piece of wavelength separation image data other than the priority image data, the authentication apparatus 208 adjusts the amounts of light of the light sources 202 so that the other piece of wavelength separation image data has a luminance value within a predetermined range from objective luminance, which is luminance within an appropriate range, on the condition that the luminance of each of the priority image data and the RGB image data Is stay within a predetermined range from objective luminance, which is luminance within an appropriate range.

Third Embodiment

A third embodiment of this invention is an example in which influence of external light, such as sunlight or room lighting, is significant, and light source control for photographing a living body even more clearly is executed in the first embodiment and the second embodiment. Components that are the same as the components in the first embodiment are denoted by the same reference symbols, and description thereof is omitted.

The first embodiment and the second embodiment give description of methods of photographing a clear image by light source control with the use of a piece of color-component image data in which the sum of color component-by-color component light reception sensitivities $\{(\alpha R+\beta R), (\alpha G+\beta G), (\alpha B+\beta B)\}$ to beams of light of a plurality of wavelengths irradiated from the light sources 202 is maximum, out of the pieces of color-component image data Ir, Ig, and Ib of the RGB image data Is acquired by photographing.

Light sensitivity characteristics of the imaging unit 201 with respect to wavelengths of irradiated beams of light are known beforehand, and it is accordingly premised that which of the pieces of color-component image data of the RGB image data Is is liable to have high luminance can be determined prior to the photographing. However, there is a possibility that the piece of color-component image data that is the brightest of the pieces of color-component image data Ir, Ig, and Ib of the RGB image data Is acquired by photographing varies due to the influence of light from a room lamp or the like that is very intense in a specific wavelength range. A light source control method that takes into consideration such influence of ambient light (external light) at the time of photographing is described.

Figure 9:
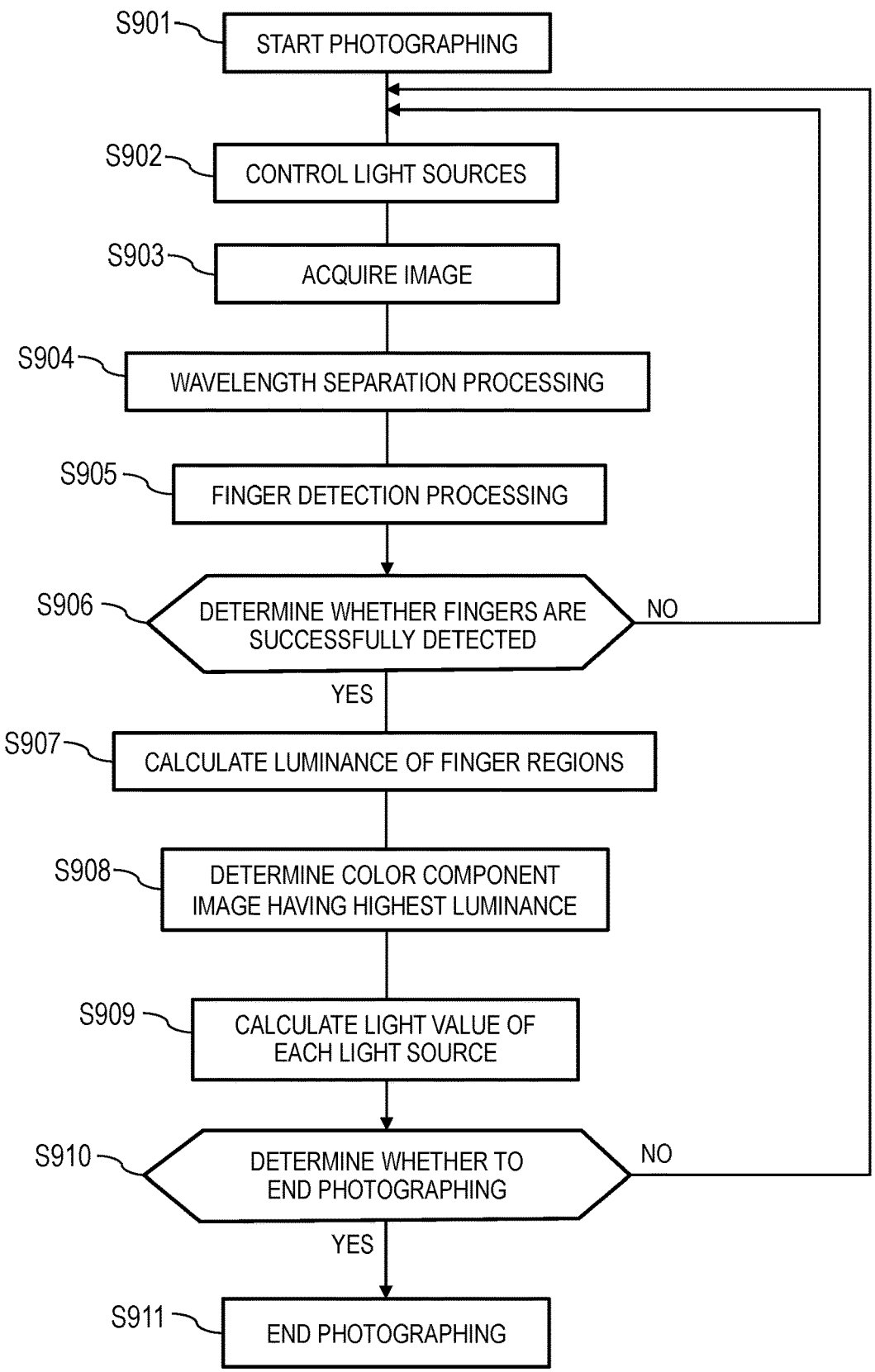
FIG. 9 is a flow chart for illustrating an example of steps of biometric image photographing processing in the third embodiment.

FIG. 9 is a flow chart for illustrating an example of steps of biometric image photographing processing in the third embodiment. In FIG. 9, the authentication apparatus 208 is an executor of the processing. However, that is an example and the photographing apparatus 200 may serve as the executor. Processing steps from start of photographing in Step S901 to calculation of luminance of finger regions from image data in Step S907 are the same as the processing steps from Step S501 to Step S507 in the flow chart of FIG. 5 in the first embodiment, and description thereof is accordingly omitted.

In Step S908, the authentication apparatus 208 calculates luminance information such as average luminance, about the luminance calculated in Step S907 for the finger regions of the pieces of color-component image data Ir, Ig, and Ib of the RGB image data Is. The authentication apparatus 208 then determines a piece of color-component image data that has the highest luminance due to the irradiation light of the light sources 202 and the influence of the external light.

In Step S909, the authentication apparatus 208 uses at least the luminance of the piece of color-component image data determined in Step S908 to be highest in luminance to calculate, based on the luminance of the finger regions calculated in Step S907, light values of the plurality of light sources 202 as values to be used the next time photographing is executed.

For the light source control in Step S902 and the calculation of the light values of the light sources 202 in Step S909, the authentication apparatus 208 uses the luminance Lr, the luminance Lg, and the luminance Lb of the pieces of color-component image data Ir, Ig, and Ib of the RGB image data Is acquired by photographing with concurrently irradiated beams of light of a plurality of wavelengths, as well as the luminance Li of the wavelength separation image data Ii and the luminance Lc of the wavelength separation image data Ic.

The amounts of light are adjusted so that, out of the pieces of color-component image data of the finger image data Is acquired by photographing, the luminance Lr, Lg, or Lb of the piece of color-component image data Ir, Ig, or Ib in which the sum of color component-by-color component light reception sensitivities $\{(\alpha R+\beta R), (\alpha G+\beta G), (\alpha B+\beta B)\}$ to the concurrently irradiated beams of light of different wavelengths is maximum is not too high or too low but is within an appropriate luminance range. After that, the light values of the light sources 202 are similarly adjusted for the pieces of wavelength separation image data Ii and Ic so that the luminance Li and the luminance Lc are within an appropriate luminance range.

In the third embodiment, the beams of irradiation light of the light sources 202 are near-infrared light and green light. The description gives an example of how the light value is calculated for each of the light sources 202 in Step S909 with use of the RGB image data Is acquired by the imaging unit 201 having sensitivities to near-infrared light and visible light, when fingers are irradiated with those two beams of light at the same time.

The luminance Lr, the luminance Lg, and the luminance Lb of the pieces of color-component image data Ir, Ig, and Ib of the photographed image can be expressed by Expressions (14) to (16), as functions of the luminance Li of the wavelength separation image data Ii, which corresponds to a component of beams of light irradiated from the light sources 202 that is near-infrared light, the luminance Lc of the wavelength separation image data Ic, which corresponds to a component of beams of light irradiated from the light sources 202 that is green light, and luminance Lo of wavelength separation image data Io, which corresponds to an external light component having a specific wavelength.

$$Lr=Fr2(Li,Lc,Lo) \quad (14)$$

$$Lg=Fg2(Li,Lc,Lo) \quad (15)$$

$$Lb=Fb2(Li,Lc,Lo) \quad (16)$$

The functions Fr2, Fg2, and Fb2 are functions that have, as inputs, the luminance Li of the wavelength separation image data Ii, the luminance Lc of the wavelength separation image data Ic, and the luminance Lo of the wavelength separation image data Io. Three unknowns, namely, the luminance Li of the wavelength separation image data Ii, the luminance Lc of the wavelength separation image data Ic, and the luminance Lo of the wavelength separation image data Io can be obtained by solving a simultaneous equation of Expressions (14) to (16), based on measured values of the luminance Lr of the R-color component image data Ir, the luminance Lg of the G-color component image data Ig, and the luminance Lb of the B-color component image data Ib. The luminance Li of the wavelength separation image data Ii of the near-infrared light and the luminance Lc of the wavelength separation image data Ic of the green light which are acquired by the wavelength separation processing can be expressed as functions of the near-infrared light amount Qi and the green light amount Qc by Expressions (17) and (18), respectively.

$$Li=Fi2(Qi) \qquad (17)$$

$$Lc=Fc2(Qc) \qquad (18)$$

The functions Fi2 and Fc2 are functions that have, as inputs, the near-infrared light amount Qi and the green light amount Qc, respectively. The luminance Lo of the wavelength separation image data Io acquired by separation into the wavelength range of the external light component based on measured values of the luminance Lr of the R-color component image data Ir, the luminance Lg of the G-color component image data Ig, and the luminance Lb of the B-color component image data Ib can be expressed as a function of the external light by Expression (19), because the external light is limited to a specific wavelength range.

$$Lo=Fn(Lo) \qquad (19)$$

The function Fn is a function that has a light value of the external light as an input. However, the external light is basically unknown and uncontrollable in amount of light. For that reason, it is infeasible to obtain the relationship of Expression (19) and adjust the luminance Lo of the wavelength separation image data Io of the external light component. The authentication apparatus 208 accordingly obtains relationships of the irradiation light amounts of beams of light irradiated from the light sources 202 at different wavelengths and the amount of external light to the luminance Lr, the luminance Lg, and the luminance Lb of the pieces of color-component image data Ir, Ig, and Ib, and the luminance Li, the luminance Lc, and the luminance Lo of the pieces of wavelength separation image data Ii, Ic, and Io (Expressions (14) to (18)). The authentication apparatus 208 then adjusts the irradiation light amounts of the light sources 202 so that measured values of the luminance Lr, the luminance Lg, and the luminance Lb of the pieces of color-component image data Ir, Ig, and Ib are within an appropriate range, and so that the luminance Li and the luminance Lc of the pieces of wavelength separation image data Ii and Ic are within an appropriate luminance range.

It is assumed in this example that, out of the pieces of color-component image data Ir, Ig, and Ib of the RGB image data Is, the B-component image data Ib is the piece of color-component image data in which the sum of sensitivities {(ar+br+cr), (ag+bg+cg), (ab+bb+cb)} to the near-infrared light, the green light, and the external light irradiating the fingers at the same time is maximum ((ab+bb+cb) is maximum). The symbols "ar, br, cr, ag, bg, cg, ab, bb, and cb" are described later in Expressions (20) to (22).

In this case, the luminance Lb of the B-component image data Ib is highest and is prone to a state in which biometric information is lost, such as saturation of the luminance Lb. The pieces of wavelength separation image data Ii and Ic that are clear can accordingly be acquired by adjusting the irradiation light amounts of the light sources 202 so that at least the luminance Lb of the B-component image data Ib in which the sum of the sensitivities to the near-infrared light and the green light irradiated from the light sources 202 and the sensitivity to the external light is maximum is contained within an appropriate range, and so that the luminance Li and the luminance Lc of the pieces of wavelength separation image data Ii and Ic are within an appropriate luminance range as well.

In the example in which the B-component image data Ib is maximum in terms of the sum of sensitivities to the near-infrared light and the green light irradiating the fingers at the same time and the sensitivity to the external light, the authentication apparatus 208 uses at least the luminance Lb of the B-component image data Ib to adjust the amounts of light of the light sources 202. The authentication apparatus 208 may additionally use the luminance of other pieces of image data, namely, the luminance Lr of the R-component image data Ir and the luminance Lg of the G-component image data Ig to adjust the amounts of light of the light sources 202. The wavelength separation image data Ii and the wavelength separation image data Ic that are clearer can be acquired by setting all of the luminance Lr, the luminance Lg, and the luminance Lb of the pieces of color-component image data Ir, Ig, and Ib of the RGB image data Is required to generate the wavelength separation image data Ii and the wavelength separation image data Ic to values within the appropriate range.

Next, description is given of an example of a light source control method used when it is assumed that the luminance Lr, the luminance Lg, and the luminance Lb of the pieces of color-component image data Ir, Ig, and Ib acquired from the measured RGB image data Is can be expressed by linear combination of the plurality of pieces of wavelength separation image data Ii and Ic. The R-color component image data Ir, the G-color component image data Ig, and the B-color component image data Ib are acquired by photographing. The luminance Lr, the luminance Lg, and the luminance Lb of the R-color component image data Ir, the G-color component image data Ig, and the B-color component image data Ib acquired by photographing are assumed to have linearity with the luminance Li of the wavelength separation image data Ii, which corresponds to a component of beams of light irradiated from the light sources 202 that is near-infrared light, the luminance Lc of the wavelength separation image data Ic, which corresponds to a component of beams of light irradiated from the light sources 202 that is green light, and the luminance Lo of the wavelength separation image data Io, which corresponds to the external light component, and can accordingly be expressed by Expressions (20) to (22).

$$Lr=Br \times (ar \times Li + br \times Lc + cr \times Lo) \qquad (20)$$

$$Lg=Bg \times (ag \times Li + bg \times Lc + cg \times Lo) \qquad (21)$$

$$Lb=Bb \times (ab \times Li + bb \times Lc + cb \times Lo) \qquad (22)$$

Values Br, Bg, and Bb are coefficients each of which can take any value. Values ar, ag, and ab are known coefficients indicating light reception sensitivities to light of the pieces of color component image data Ir, Ig, and Ib of the RGB image data Is acquired by the imaging unit 201 at the wavelength of the near-infrared light. Values br, bg, and bb are known coefficients indicating light reception sensitivities to light of the pieces of color component image data Ir, Ig, and Ib of the RGB image data Is at the wavelength of the green light.

Values cr, cg, and cb are known coefficients indicating light reception sensitivities to light of the pieces of color-component image data Ir, Ig, and Ib of the RGB image data Is at the wavelength of the external light. The luminance Li, the luminance Lc, and the luminance Lo which are unknowns can be obtained by solving a simultaneous equation of Expressions (20) to (22). A relationship between the luminance Li of the near-infrared light wavelength separation image data Ii and the near-infrared light amount Qi and a relationship between the luminance Lc of the green light wavelength separation image data Ic and the green light amount Qc can be expressed by Expression (23) and Expression (24), respectively.

$$Li = Ai \times Qi \quad (23)$$

$$Lc = Bc \times Qc \quad (24)$$

A value Ai is a coefficient indicating the relationship between the near-infrared light amount Qi and the luminance Li of the near-infrared light wavelength separation image data Ii. A value Bc is a coefficient indicating the relationship between the green light amount Qc and the luminance Lc of the green light wavelength separation image data Ic.

In this manner, the piece of color-component image data Ir, Ig, or Ib in which the luminance of the RGB image data Is highest is identified, and the irradiation light amounts of the light sources 202 are adjusted, by taking the influence of the luminance Lo of the external light component into consideration, so that the luminance Lr, Lg, or Lb expressed by Expression (20), (21), or (22) that is the luminance of the identified piece of color-component image data is contained within an appropriate range, and so that the luminance Li and the luminance Lc of the pieces of wavelength separation image data Ii and Ic are within an appropriate luminance range, to thereby acquire the pieces of wavelength separation image data Ii and Ic that are clear.

Fourth Embodiment

As a fourth embodiment of this invention, a method of matching a plurality of pieces of biometric feature data with use of pieces of wavelength separation image data acquired after the irradiation light amounts of the light sources 202 are adjusted by light source control in the first to third embodiments is described.

The pieces of wavelength separation image data generated from the RGB image data Is acquired by photographing after the irradiation light amounts of the light sources 202 are adjusted include biometric information that varies from wavelength to wavelength. The authentication apparatus 208 includes an extraction module for extracting different biometric feature data from each piece of wavelength separation image data, and a matching module for matching a plurality of pieces of biometric feature data (multi-modal biometric feature data) extracted by the extraction module. The extraction module and the matching module are functions implemented by the processor 311 by executing an extraction program and a matching program, respectively, which are stored in the storage device 312. Authentication that is higher in precision than when a single piece of biometric feature data is used is thus accomplished.

In the fourth embodiment, the matching module calculates reliability for each piece of wavelength separation image data (modality) acquired after the amounts of light of the plurality of light sources 202 are adjusted, based on luminance of each piece of wavelength separation image data. For example, luminance at which saturation is avoided and a biometric feature such as a light-dark contrast in luminance in a blood vessel region can be more accurately captured is stored as objective luminance in the storage device 312 in advance for each piece of wavelength separation image data.

The reliability of each piece of wavelength separation image data acquired after the light amounts are adjusted is set so as to be higher when a difference between the luminance of the piece of wavelength separation image data and the objective luminance described above is smaller. The matching module determines, based on a ratio of the reliability calculated for each modality, a ratio at which results of matching of pieces of biometric feature data of different modalities are combined. For example, when there are two pieces of wavelength separation image data, the matching module matches Biometric Feature Data 1 and Biometric Feature Data 2 extracted from the two pieces of wavelength separation image data against a biometric feature registered in advance, and calculates Matching Score 1 and Matching Score 2 corresponding to degrees of similarity.

When the two matching scores, namely, Matching Score 1 and Matching Score 2, are combined into one matching score by linear combination or the like, weights of the matching scores to be used in the linear combination are determined based on the ratio of magnitudes of the reliability calculated for each piece of wavelength separation image data. The matching score of a piece of wavelength separation image data that is higher in reliability can thus be reflected in a score obtained by the combination. Authentication that is even higher in precision is accordingly accomplished by setting high reliability to a piece of wavelength separation image data in which a biometric feature such as a light-dark contrast in luminance in a blood vessel region is more accurately captured.

Figure 10:
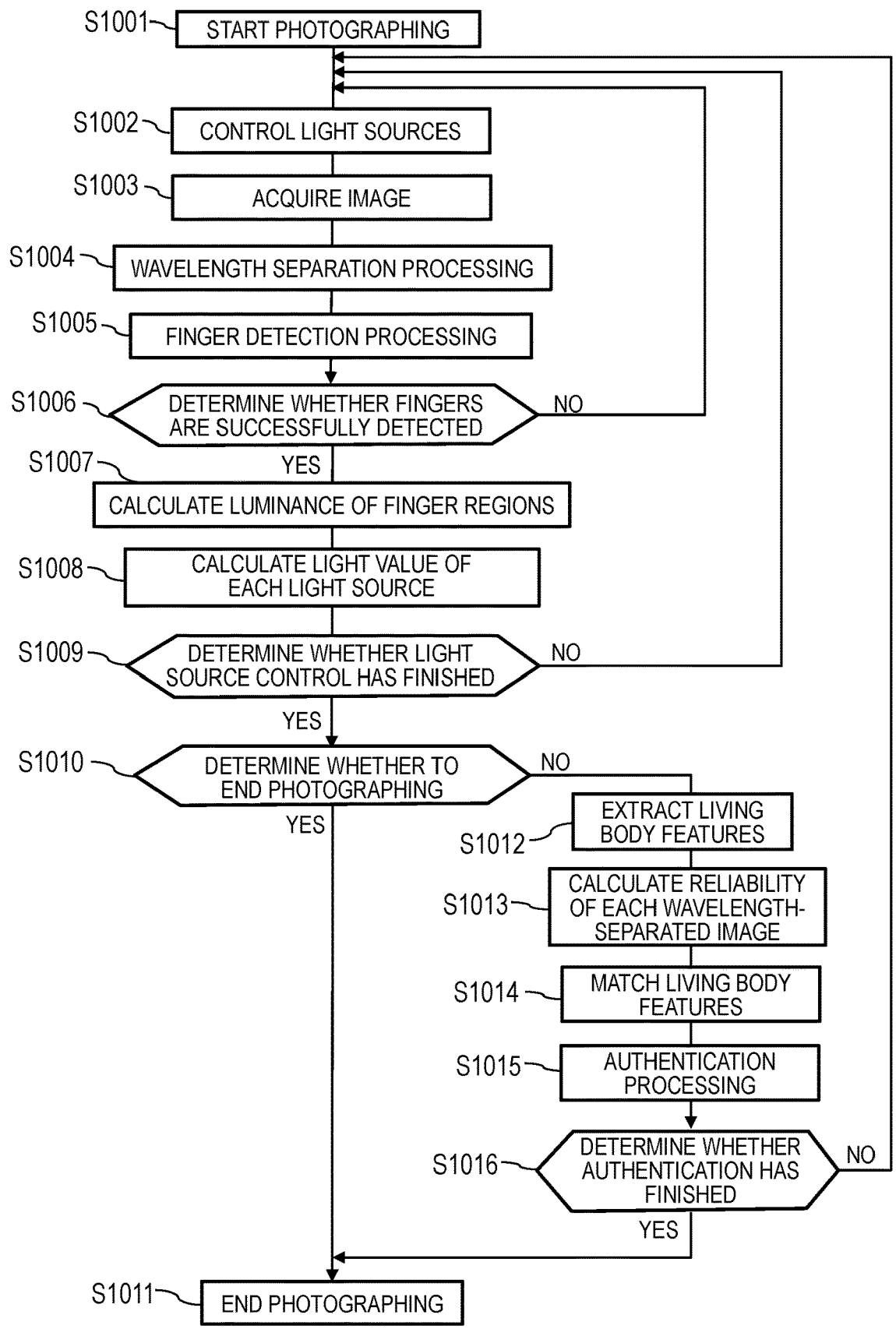
FIG. 10 is a flow chart for illustrating an example of steps of biometric image photographing processing in the fourth embodiment.

FIG. 10 is a flow chart for illustrating an example of steps of biometric image photographing processing in the fourth embodiment. In FIG. 10, the authentication apparatus 208 is an executor of the processing. However, that is an example and the photographing apparatus 200 may serve as the executor. Processing steps from start of photographing in Step S1001 to calculation of light values of the light sources in Step S1008 are the same as the processing steps from Step S501 to Step S508 in the flow chart of FIG. 5 in the first embodiment, and description thereof is accordingly omitted.

In Step S1009, the authentication apparatus 208 determines whether light source control has finished based on the light values of the light sources 202, the luminance of the RGB image data Is acquired by photographing, and the luminance of each piece of wavelength separation image data. When it is determined that the light source control has finished (Step S1009: Yes), the authentication apparatus 208 executes photographing end determination in the next step, which is Step S1010. When it is determined that the light source control has not finished (Step S1009: No), the process returns to the light source control of Step S1002.

In the photographing end determination of Step S1010, the authentication apparatus 208 determines, for example, whether a time-out time counted from the start of the photographing has arrived. In a case in which the time-out time has arrived or when it is determined, based on other indicators, the photographing is to be ended (Step S1010: Yes), the authentication apparatus 208 ends the photographing in Step S1011. When it is determined that the photographing is not to be ended (Step S1010: No), the authentication apparatus 208 executes extraction of biometric feature data with use of the extraction module (Step S1012) to extract biometric feature data for executing matching in the finger regions of each piece of wavelength separation image data.

The authentication apparatus 208 next uses the matching module to calculate the reliability of each piece of wavelength separation image data as described above (Step S1013). The authentication apparatus 208 uses the matching module to calculate a matching score (Step S1014) by matching multi-modal biometric feature data extracted from the finger regions of each piece of wavelength separation image data (near-infrared light image data and green light image data) in Step S1012 against multi-modal biometric feature data registered in advance in a database. The database is implemented by the storage device 312, or by the storage device 312 of another computer that can hold communication to and from the computer 310. The matching score is calculated by, for example, template matching, feature point matching, or a similar type of matching.

In authentication processing of Step S1015, the authentication apparatus 208 combines every matching score calculated in Step 1014 for the biometric feature data of each modality of the multi-modal biometric feature data, based on the reliability obtained in Step S1013 for each piece of wavelength separation image data (modality), and executes authentication success/failure determination for a matching score obtained by the combination.

In the authentication success/failure determination, the authentication apparatus 208 determines that the authentication is a success when the matching score is higher than a threshold value set in advance, and determines that the authentication is a failure when the matching score is equal to or lower than the threshold value. Combining of matching scores is executed by, for example, linear combination of the matching score of each modality. A coefficient of the matching score of each modality in the linear combination is determined based on the reliability obtained in Step S1013 as described above. This raises the ratio of a matching score of modality that has high reliability in the combination, and the precision of authentication is consequently improved.

In authentication completion determination of Step S1016, the authentication apparatus 208 determines whether the authentication reaches completion as a result of executing the authentication processing based on the matching score in Step S1015. When it is determined that the authentication reaches completion (Step S1016: Yes), the authentication apparatus 208 ends the photographing in Step S1011. When it is determined that the authentication is yet to reach completion (Step S1016: No), the process returns to the light source control of Step S1002.

In the determination of Step S1009 about whether the light source control has finished, the authentication apparatus 208 can base the determination on whether the luminance of the RGB image data Is acquired by photographing and the luminance of each piece of wavelength separation image data are each contained within an appropriate range. The authentication apparatus 208 may execute the determination about whether the light source control has finished for a plurality of successive frames. When light source control is finished with the luminance of each piece of wavelength separation image data contained within an appropriate range continuously in a plurality of frames, whether the light source control has finished can be determined more accurately and stably. Even when the luminance of not every piece of wavelength separation image data is contained within an appropriate range, a state in which the luminance value continuously remains stable may be used as a condition for determining that the light source control has finished.

In the calculation of the reliability of each piece of wavelength separation image data in Step S1013, the authentication apparatus 208 calculates the reliability of each piece of wavelength separation image data based on an index indicating whether the luminance of that piece of wavelength separation image data is close to an appropriate value, or a similar index. When a plurality of fingers are detected, the calculated reliability of each piece of wavelength separation image data can be applied to every detected finger. A reliability value used for one detected finger may differ from a reliability value used for another detected finger. In this manner, the authentication apparatus 208 can calculate the reliability based on average luminance or other types of luminance information of finger regions detected for each piece of wavelength separation image data.

Luminance in some of the finger regions may be too high or too low due to large individual differences between living bodies or large variations in the posture of a hand. When it is difficult to uniformly adjust the luminance of every finger to a value within an appropriate range as in this case, the authentication apparatus 208 can improve the precision of authentication by setting high reliability to a finger that has luminance in a more appropriate range, and setting low reliability to a finger that has luminance outside the appropriate range.

It should be noted that this disclosure is not limited to the above-mentioned embodiments, and encompasses various modification examples and the equivalent configurations within the scope of the appended claims without departing from the gist of this disclosure. For example, the above-mentioned embodiments are described in detail for a better understanding of this disclosure, and this disclosure is not necessarily limited to what includes all the configurations that have been described. Further, a part of the configurations according to a given embodiment may be replaced by the configurations according to another embodiment. Further, the configurations according to another embodiment may be added to the configurations according to a given embodiment. Further, a part of the configurations according to each embodiment may be added to, deleted from, or replaced by another configuration.

Further, a part or entirety of the respective configurations, functions, processing modules, processing means, and the like that have been described may be implemented by hardware, for example, may be designed as an integrated circuit, or may be implemented by software by a processor interpreting and executing programs for implementing the respective functions.

The information on the programs, tables, files, and the like for implementing the respective functions can be stored in a storage device such as a memory, a hard disk drive, or a solid state drive (SSD) or a recording medium such as an IC card, an SD card, or a DVD.

Further, control lines and information lines that are assumed to be necessary for the sake of description are described, but not all the control lines and information lines that are necessary in terms of implementation are described. It may be considered that almost all the components are connected to one another in actuality.

What is claimed is:
1. A photographing apparatus, comprising:
a processor, the processor is configured to:
irradiate a living body with beams of light having a plurality of wavelengths different from one another, wherein the living body comprises a plurality of fingers;
photograph the irradiated living body to generate image data of the living body;
generate, based on the image data, a plurality of pieces of wavelength separation image data, by separation into the plurality of wavelengths; and control, based on the image data and on the plurality of pieces of wavelength separation image data, irradiation light amounts of the beams of light having the plurality of wavelengths, wherein the processor is configured to control the irradiation light amounts of the beams of light having the plurality of wavelengths, based on regions of some of the plurality of fingers that are included in the image data about the plurality of fingers and the plurality of pieces of wavelength separation image data.

2. The photographing apparatus according to claim 1, wherein the processor is configured to control the irradiation light amounts of the beams of light having the plurality of wavelengths so that luminance of the image data and luminance of each of the plurality of pieces of wavelength separation image data are contained within a predetermined range.

3. The photographing apparatus according to claim 2, wherein the image data includes a plurality of pieces of attribute image data having different attributes.

4. The photographing apparatus according to claim 3, wherein the processor is further configured to control the irradiation light amounts of the beams of light having the plurality of wavelengths so that luminance of at least a specific piece of attribute image data in which a sum of sensitivities to the beams of light at the plurality of wavelengths is largest out of the plurality of pieces of attribute image data is contained within a predetermined range.

5. The photographing apparatus according to claim 4, wherein the processor is further configured to control the irradiation light amounts of the beams of light having the plurality of wavelengths so that luminance of a specific piece of attribute image data in which a sum of sensitivities to the beams of light having the plurality of wavelengths and a sensitivity to light having another wavelength is largest out of the plurality of pieces of attribute image data is contained within a predetermined range, the light having the another wavelength being light that is received but is not one of the beams of light having the plurality of wavelengths.

6. The photographing apparatus according to claim 1, wherein the processor is further configured to control the irradiation light amounts of the beams of light having the plurality of wavelengths so that luminance of a specific piece of wavelength separation image data that contributes to precision of authentication at a high contribution ratio out of the plurality of pieces of wavelength separation image data is contained within a predetermined range.

7. An authentication apparatus, comprising:
a processor, the processor is configured to:
irradiate a living body with beams of light having a plurality of wavelengths different from one another, wherein the living body comprises a plurality of fingers;
photograph the irradiated living body to generate image data of the living body;
generate, based on the image data, a plurality of pieces of wavelength separation image data, by separation into the plurality of wavelengths;
control, based on the image data and on the plurality of pieces of wavelength separation image data, irradiation light amounts of the beams of light having the plurality of wavelengths;
extract a plurality of pieces of living body feature data by extracting living body feature data from each of the plurality of pieces of wavelength separation image data; and
match each of the plurality of pieces of living body feature data against living body feature data registered in advance,
wherein the processor is configured to control the irradiation light amounts of the beams of light having the plurality of wavelengths, based on regions of some of the plurality of fingers that are included in the image data about the plurality of fingers and the plurality of pieces of wavelength separation image data.

* * * * *